United States Patent
Wang et al.

(10) Patent No.: US 11,582,013 B2
(45) Date of Patent: *Feb. 14, 2023

(54) METHOD AND APPARATUS FOR DETERMINING RESOURCE BLOCK GROUP SIZE

(71) Applicant: Huawei Technologies Co., Ltd., Shenzhen (CN)

(72) Inventors: Ting Wang, Shanghai (CN); Zhe Liu, Shanghai (CN); Yuanjie Li, Shanghai (CN); Hao Tang, Ottawa (CA); Zhenfei Tang, Shanghai (CN); Yi Wang, Shanghai (CN); Hua Li, Warsaw (PL); Yongzhao Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,393

(22) Filed: Apr. 7, 2022

(65) Prior Publication Data

US 2022/0303101 A1 Sep. 22, 2022

Related U.S. Application Data

(63) Continuation of application No. 16/851,981, filed on Apr. 17, 2020, now Pat. No. 11,329,792, which is a (Continued)

(30) Foreign Application Priority Data

Jun. 16, 2017 (CN) .......................... 201710459135.8
Nov. 17, 2017 (CN) .......................... 201711149071.8

(51) Int. Cl.
*H04W 4/00* (2018.01)
*H04L 5/00* (2006.01)
(Continued)

(52) U.S. Cl.
CPC .......... *H04L 5/0094* (2013.01); *H04L 1/1614* (2013.01); *H04L 5/003* (2013.01);
(Continued)

(58) Field of Classification Search
None
See application file for complete search history.

(56) References Cited

U.S. PATENT DOCUMENTS

2009/0325585 A1* 12/2009 Farajidana ............ H04W 72/14
455/450
2013/0128852 A1 5/2013 Xue et al.
(Continued)

FOREIGN PATENT DOCUMENTS

| CN | 102238627 A | 11/2011 |
| CN | 102340875 A | 2/2012 |

(Continued)

OTHER PUBLICATIONS

3rd Generation Partnership Project;Technical Specification Group Radio Access Network; Evolved Universal Terrestrial Radio Access (E-UTRA); Physical channels and modulation (Release 14), 3GPP TS 36.211 V14.2.0 (Mar. 2017), 196 pages.
(Continued)

*Primary Examiner* — Zewdu A Beyen
(74) *Attorney, Agent, or Firm* — Slater Matsil, LLP

(57) ABSTRACT

A method and an apparatus for determining an RBG size are provided. In the method, a network device or a terminal determines an RBG size set, where the RBG size set may include one or more possible RBG sizes; and determines a first RBG size included in the RBG size set. The network device allocates a resource to the terminal by using the determined first RBG size. The terminal determines, based on the determined first RBG size, the resource allocated by the network device to the terminal.

30 Claims, 12 Drawing Sheets

Related U.S. Application Data continuation of application No. 16/235,757, filed on Dec. 28, 2018, now Pat. No. 10,742,386, which is a continuation of application No. PCT/CN2018/091658, filed on Jun. 15, 2018.

(51) Int. Cl.
  *H04W 72/04* (2023.01)
  *H04W 72/0453* (2023.01)
  *H04L 1/1607* (2023.01)
  *H04L 27/26* (2006.01)

(52) U.S. Cl.
  CPC .......... *H04L 5/0044* (2013.01); *H04L 5/0053* (2013.01); *H04L 5/0091* (2013.01); *H04L 27/26* (2013.01); *H04W 72/04* (2013.01); *H04W 72/042* (2013.01); *H04W 72/0453* (2013.01); *H04L 5/0058* (2013.01)

(56) References Cited

U.S. PATENT DOCUMENTS

| | | | |
|---|---|---|---|
| 2014/0044085 A1 | 2/2014 | Hong | |
| 2016/0142919 A1* | 5/2016 | Baldemair | H04L 5/0094 455/447 |
| 2018/0235012 A1 | 8/2018 | Chen et al. | |

FOREIGN PATENT DOCUMENTS

| | | |
|---|---|---|
| CN | 102668673 A | 9/2012 |
| CN | 105099634 A | 11/2015 |
| CN | 105636211 A | 6/2016 |
| KR | 20140054242 A | 5/2014 |
| RU | 2407201 C2 | 12/2010 |
| WO | 2016053450 A1 | 4/2016 |
| WO | 2018097658 A1 | 5/2018 |
| WO | 2018137690 A1 | 8/2018 |

OTHER PUBLICATIONS

3rd Generation Partnership Project; Technical Specification Group Radio Access Network; Evolved Universal Terrestrial Radio Access (E-UTRA); Multiplexing and channel coding (Release 13), 3GPP TS 36.212 V13.5.0 (Mar. 2017), 140 pages.

3rd Generation Partnership Project; Technical Specification Group Radio Access Network; Evolved Universal Terrestrial Radio Access (E-UTRA); Physical layer procedures (Release 14), 3GPP TS 36.213 V14.2.0 (Mar. 2017), 454 pages.

3rd Generation Partnership Project; Technical Specification Group Radio Access Network; New Radio (NR); Requirements for support of radio resource management (Release 15), 3GPP TS 38.133 V0.0.1 (May 2017), 14 pages.

3rd Generation Partnership Project; Technical Specification Group Radio Access Network; NR; Physical channels and modulation (Release 15), 3GPP TS 38.211 V0.0.0 (May 2017), 10 pages.

3rd Generation Partnership Project; Technical Specification Group Radio Access Network; NR; Multiplexing and channel coding (Release 15), 3GPP TS 38.212 V0.0.0 (May 2017), 10 pages.

3rd Generation Partnership Project; Technical Specification Group Radio Access Network; NR; NR and NG-RAN Overall Description; Stage 2 (Release 15), 3GPP TS 38.300 V0.4.1 (Jun. 2017), 55 pages.

3rd Generation Partnership Project; Technical Specification Group Radio Access Network; NR; Radio Resource Control (RRC); Protocol specification (Release 15 ), 3GPP TS 38.331 V0.0.3 (May 2017), 20 pages.

"RAN1 Chairman's Notes," 3GPP TSG RAN WG1 Meeting #89, Hangzhou, P.R. China May 15-19, 2017, 144 pages.

CATT, NR DL scheduling mechanism, 3GPP TSG RAN WG1 Meeting #89, R1-1707508, Hangzhou, P. R China, May 15-19, 2017, 4 pages.

Ericsson, "Design aspects of sPDSCH", 3GPP TSG-RAN WG1 Meeting #89, R1-1708865, Hangzhou, P.R. China, May 15-29, 2017, 4 pages.

Ericsson, "Summary of offline discussion on RBG size," TSG-RAN WG1 #90bis, R1-1719167, Prague, Czech Republic, Oct. 9-13, 2017, 1 page.

Ericsson, "On Frequency-domain and Time-domain Resource Allocation," 3GPP TSG-RAN WG1 Meeting #89, R1-1709095, Hangzhou, China, May 15-19, 2017, 3 pages.

Ericsson, "On DL/UL Resource Allocation", 3GPP TSG RAN1 WG1 Meeting #90bis, R1-1718644, Prague, Czech Republic, Oct. 9-13, 2017, 9 pages.

Huawei et al., "Scheduling and resource allocation mechanism for active bandwidth parts", 3GPP TsSG RAN WG1 NOR Ad Hoc Meeting, R1-1709974, Qingdao, China, Jun. 27-30, 2017, 7 pages.

MCC Support, "Final Report of 3GPP TSG RAN WG1 #90bis v1.0.0 (Prague, Czech Rep, Oct. 9-13, 2017)", 3GPP TSG RAN WG1 Meeting #91, R1-1719301, Reno, NV, US, Nov. 27-Dec. 1, 2017, 206 pages.

NEC, "Frequency and time resource allocation schemes for NR," 3GPP TSG-RAN WG1 Meeting #89, R1-1707200, Hangzhou, P.R. China, May 15-19, 2017, 5 pages.

NTT DOCOMO, Inc., "Resource allocation for DL data," 3GPP TSG RAN WG1 Meeting #89, R1-1708478, Hangzhou, P. R. China, May 15-19, 2017, 5 pages.

NTT DOCOMO, "Way forward on RBG size," 3GPP TSG RAN WG1 Meeting #89, R1-1709740, Hangzhou, May 15-19, 2017, 3 pages.

Oppo, et al., "Outputs of offline discussion on RBG size/number determination", 3GPP TSG RAN WG1 NR Ad-Hoc#2, R1-1711843, Qingdao, P.R. China, Jun. 27-30, 2017, 5 pages.

Oppo, "Resource allocation for PDSCH/PUSCH", 3GPP TSG RAN WG1 Meeting 90bis, R1-1718048, Prague, Czech Republic, Oct. 9-13, 2017, 13 pages.

Samsung, "DL Resource Allocation Aspects," 3GPP TSG RAN WG1 Meeting #89, R1-1708017, Hangzhou, China, May 15-19, 2017, 8 pages.

* cited by examiner

METHOD AND APPARATUS FOR DETERMINING RESOURCE BLOCK GROUP SIZE

CROSS-REFERENCE TO RELATED APPLICATIONS

This application is a continuation of U.S. patent application Ser. No. 16/851,981, filed on Apr. 17, 2020, which is a continuation of U.S. patent application Ser. No. 16/235,757, filed on Dec. 28, 2018, now U.S. Pat. No. 10,742,386, which is a continuation of International Application No. PCT/CN2018/091658, filed on Jun. 15, 2018, which claims priority to Chinese Patent Application No. 201711149071.8, filed on Nov. 17, 2017, and Chinese Patent Application No. 201710459135.8, filed on Jun. 16, 2017. All of the aforementioned patent applications are hereby incorporated by reference in their entireties.

TECHNICAL FIELD

This application relates to the field of communications technologies, and in particular, to a method and an apparatus for determining a resource block group size.

BACKGROUND

A resource block group (RBG) is a group of continuous centralized virtual resource blocks (VRB). An RBG size indicates a quantity of VRBs included in each RBG. A virtual resource block may be a physical resource block (PRB), or may be an RB obtained after a PRB is converted according to a specific rule, or may be an RB in a general sense. In Long Term Evolution (LTE), an RBG size is usually a fixed size determined based on system bandwidth. For example, when the system bandwidth is less than or equal to 10 RBs, the RBG size is one RB, that is, one RB is one RBG; or when the system bandwidth includes 11 RBs to 26 RBs, the RBG size is two RBs, that is, two RBs are one RBG.

With evolution of a communications system, a 5th Generation (5G) new radio (NR) communications system is under research. In 5G NR, system bandwidth may be 100 M, 400 M, 500 M, or the like, and the system bandwidth may be divided into one or more bandwidth parts (BWP or BP). To support different services, different frame structure parameters (such as a subcarrier spacing and/or a CP length) may be used for different BPs, and a slot or a mini-slot is used as a scheduling unit. However, different frame structures result in that BPs of a same size include different quantities of RBs. In addition, time domain scheduling resources in NR may be flexibly scheduled. Therefore, a requirement of 5G NR cannot be met by determining an RBG of a fixed size based on system bandwidth in LTE.

SUMMARY

Embodiments of this application provide a method and an apparatus for determining an RBG size, to improve RBG size scheduling flexibility.

According to a first aspect, this application provides a method for determining an RBG size. In the method, a network device or a terminal determines an RBG size set, where the RBG size set may include one or more possible RBG sizes; and determines a first RBG size included in the RBG size set. The network device allocates a resource to the terminal by using the determined first RBG size. The terminal determines, based on the determined first RBG size, the resource allocated by the network device to the terminal.

Alternatively, in the method, the network device or the terminal determines an RBG size based on at least one of control channel information, a signal transmission feature, BP information, a channel feature, system bandwidth information, a service feature, and the like. The network device allocates a resource to the terminal by using the determined RBG size. The terminal determines, based on the determined RBG size, the resource allocated by the network device to the terminal.

According to a second aspect, this application provides an apparatus for determining an RBG size. The apparatus for determining an RBG size is applied to a network device or a terminal. The apparatus for determining an RBG size includes units or means used to perform the steps performed by the network device or the terminal in the first aspect.

According to a third aspect, this application provides an apparatus for determining an RBG size. The apparatus for determining an RBG size is applied to a network device or a terminal, and includes at least one processing element and at least one storage element. The at least one storage element is configured to store a program and data. The at least one processing element is configured to perform the method provided in the first aspect of this application.

According to a fourth aspect, this application provides an apparatus for determining an RBG size. The apparatus for determining an RBG size is applied to a network device or a terminal, and includes at least one processing element (or chip) configured to perform the method in the first aspect.

According to a fifth aspect, this application provides a program for determining an RBG size. When being executed by a processor, the program is used to perform the method in the first aspect.

According to a sixth aspect, a program product is provided, for example, a computer-readable storage medium, including the program in the fifth aspect.

It can be learned that, in the foregoing aspects, the RBG size set determined by the network device or the terminal includes one or more possible RBG sizes, so that an RBG size can be more flexibly determined. The network device determines the RBG size based on at least one of the control channel information, the signal transmission feature, the BP information, the channel feature, the system bandwidth information, the service feature, and the like. Compared with determining of an RBG of a fixed size based only on system bandwidth, this can determine more types of RBG sizes, and has higher flexibility, and therefore can meet a requirement of 5G NR. Further, the network device or the terminal indicates various possible RBG sizes in a manner of determining the RBG size set. Compared with a manner of independently indicating a plurality of RBG sizes, this can reduce signaling overheads.

In the foregoing aspects, in a possible design, the network device or the terminal may determine the RBG size based on at least one of the control channel information, the signal transmission feature, the BP information, the channel feature, the system bandwidth information, the service feature, and the like.

The network device or the terminal may implicitly or explicitly determine the RBG size. For example, in an implicit determining manner, the network device or the terminal may preset an RBG size corresponding to each piece of control channel information, each signal transmission feature, each BP, each channel feature, each piece of system bandwidth information, each service feature, or the like. Further, the network device may directly determine a corresponding RBG size based on at least one of control channel information for scheduling, a signal transmission feature, BP information, a channel feature, system bandwidth information, and a service feature, and the like.

For example, in an explicit determining manner, the network device or the terminal may determine the RBG size according to a signaling indication. For example, the network device sends first configuration information to the terminal, where the first configuration information includes resource information that has a preset correspondence with an RBG size. For example, the resource information includes at least one of control channel information, a signal transmission feature, BP information, each channel feature, each piece of system bandwidth information, and each service feature. The terminal receives the configuration information sent by the network device, and determines the RBG size based on the configuration information. The network device may further send first indication information to the terminal, where the first indication information is used to indicate the RBG size. The terminal receives the first indication information sent by the network device, and determines the RBG size based on the first indication information.

In another possible design, the network device or the terminal may determine the RBG size set based on at least one of the control channel information, the signal transmission feature, the BP information, the channel feature, the system bandwidth information, the service feature, and the like.

The network device or the terminal may implicitly or explicitly determine the RBG size set. For example, in an implicit determining manner, the network device or the terminal may preset an RBG size set corresponding to each piece of control channel information, each signal transmission feature, each BP, each channel feature, each piece of system bandwidth information, each service feature, or the like. Further, the network device may directly determine a corresponding RBG size set based on at least one of control channel information for scheduling, a signal transmission feature, BP information, a channel feature, system bandwidth information, and a service feature, or the like.

In an explicit determining manner, the network device or the terminal may determine the RBG size set according to a signaling indication. For example, if determining the first RBG size, the network device may send indication information to the terminal, where the indication information is used to indicate the first RBG size. The terminal receives the indication information sent by the network device, and may determine the first RBG size in the RBG size set based on the indication information. Further, the network device may send configuration information to the terminal, where the configuration information is used to indicate the RBG size set. The terminal receives the configuration information sent by the network device, and determines the RBG size set based on the received configuration information. The indication information and the configuration information may be sent to the terminal by using higher layer signaling or physical layer information. Same signaling or different signaling may be used for the indication information and the configuration information. If the indication information and the configuration information are sent by using different signaling, for example, the configuration information is sent to the terminal by using RRC signaling, and the indication information is sent to the terminal by using DCI, the configuration information does not need to be carried in the DCI, and therefore signaling overheads of the DCI can be reduced to some extent.

In the foregoing designs, the control channel information includes one or a combination of the following: control channel format information, control channel content information, and control channel scrambling information. The signal transmission feature includes information or a channel that the resource allocated by the network device by using the determined RBG size is used to carry, where the information or the channel includes one or a combination of the following: system information, broadcast information, cell-level information, common information, user-specific information, and group information. The channel feature includes a feature of the information that the resource allocated by the network device by using the determined RBG size is used to carry. The BP information includes one or a combination of the following: bandwidth information of a BP, carrier frequency information of the BP, and frame structure information of the BP. The service feature includes at least one of a mobile broadband service, a low latency service, a high reliability service, a video service, a voice service, a real-time service, a short message service, and a low latency and high reliability service.

In another possible design, the network device or the terminal may further determine a BP subset in which the resource allocated by the network device is located. A BP subset is each part obtained after a BP is further divided. Accuracy for determining a bitmap location can be improved to some extent by using the determined BP subset.

The network device or the terminal may determine, based on subset information, the BP subset in which the resource allocated to the terminal is located. The subset information needs to be determined. Specifically, the subset information may include at least one of a subset size, a subset resource division method, a subset quantity, and subset scheduling information.

Further, the subset information may be determined based on an RBG size, or may be predefined. When the BP subset is determined based on an RBG size, a correspondence between the RBG size and the BP subset may be determined according to a specific resource scheduling requirement.

The network device or the terminal may alternatively determine the BP subset in which the resource allocated by the network device is located, based on at least one of the control channel information, the signal transmission feature, the BP information, the channel feature, the system bandwidth information, the service feature, and the like. The network device or the terminal may preset a BP subset corresponding to each piece of control channel information, each signal transmission feature, each BP, each channel feature, each piece of system bandwidth information, each service feature, or the like. Further, the network device may directly determine a corresponding BP subset based on at least one of control channel information for scheduling, a signal transmission feature, BP information, a channel feature, system bandwidth information, and a service feature, and the like.

In still another possible design, the BP subset may include a plurality of continuous or discontinuous RBs. In the embodiments of this application, the BP subset includes a plurality of discontinuous RBs. This can mitigate resource fragmentation to some extent and can also improve a diversity gain.

Further, an RBG determined by the network device or the terminal may include a plurality of continuous or discontinuous RBs.

A spacing between RBs included in a discontinuous RBG may be predefined by a protocol, or may be determined in a manner of signaling notification.

A continuous or discontinuous RBG may be randomly combined with a continuous or discontinuous BP subset. RBs included in a discontinuous RBG may be located in one BP subset, or may be located in different BP subsets.

In this application, at least one of four processes, in which the terminal determines the RBG size, determines whether an RBG is continuous, determines the BP subset, and determines whether the BP subset is continuous, may be performed in an implicit or explicit manner.

In a possible design, in the implementation processes in which the terminal determines the RBG size, determines whether the RBG is continuous, determines the BP subset, and determines whether the BP subset is continuous in the explicit manner, the first indication information indicating the RBG size, second indication information indicating BP subset information, third indication information indicating whether the BP subset is continuous, and fourth indication information indicating whether the RBG is continuous may be separately indicated by the network device to the terminal, or at least two of the four pieces of indication information may be indicated together.

DETAILED DESCRIPTION OF ILLUSTRATIVE EMBODIMENTS

Figure 1:
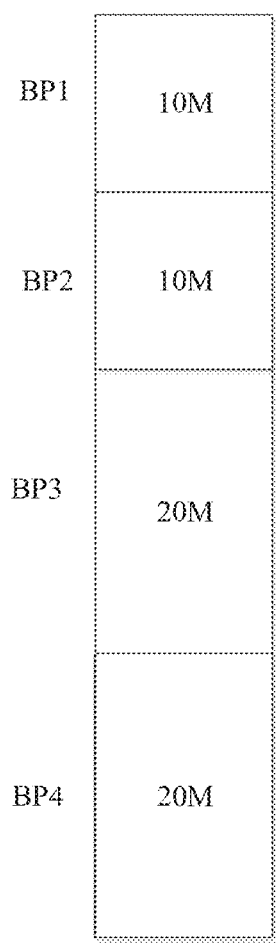
FIG. 1 is a schematic diagram of BP division in system bandwidth.

The following describes the technical solutions in the embodiments of this application with reference to the accompanying drawings.

First, some terms in this application are described, so as to help persons skilled in the art have a better understanding.

(1) A terminal, also referred to as user equipment (UE), a mobile station (MS), a mobile terminal (MT), or the like, is a device that provides voice and/or data connectivity for a user, for example, a handheld device with a wireless connection function or an in-vehicle device with a wireless connection function. Currently, examples of some terminals are: a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(2) A radio access network (RAN) is a network portion that connects a terminal to a wireless network. An RAN node (or device) is a node (or device) in the radio access network, and may be also referred to as a base station. Currently, examples of some RAN nodes are: a further evolved NodeB (gNB), a transmission reception point (TRP), an evolved NodeB (eNB), a radio network controller (RNC), a NodeB (NB), a base station controller (BSC), a base transceiver station (BTS), a home NodeB (such as a home evolved NodeB, or a home NodeB, HNB), a baseband unit (BBU), a Wireless Fidelity (Wi-Fi) access point (AP), or the like. In addition, in a network structure, the RAN may include a centralized unit (CU) node and a distributed unit (DU) node. In this structure, protocol layers of an eNB in a Long Term Evolution (LTE) system are split. Functions of some protocol layers are controlled by the CU in a centralized manner, and functions of part or all of remaining protocol layers are distributed on the DU. The CU controls the DU in a centralized manner.

(3) "Plurality" means two or more. Other quantifiers are similar. "And/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

(4) Interaction is a process in which two interaction parties transfer information to each other. The information transferred herein may be the same or may be different. For example, the two interaction parties are a base station 1 and a base station 2. The base station 1 may request information from the base station 2, and the base station 2 provides the information requested by the base station 1 for the base station 1. Certainly, the base station 1 and the base station 2 may alternatively request information from each other, and the information requested herein may be the same or may be different.

(5) Terms "network" and "system" are often used interchangeably, but persons skilled in the art may understand a meaning thereof. Terms "information", "signal", "message", and "channel" sometimes may be used without differentiation. It should be pointed out that meanings expressed by the terms are consistent when a difference between the terms is not emphasized. Terms "of", "corresponding or relevant", and "corresponding" sometimes may be used without differentiation. It should be pointed out that meanings expressed by the terms are consistent when a difference between the terms is not emphasized.

(6) A resource block group (RBG) is a combination of at least one resource block (RB). An RBG size is a quantity of RBs included in the RBG. An RBG size set is a set including at least one RBG size.

(7) A bandwidth part (BP or BWP) is a part of system bandwidth. The system bandwidth is divided into one or more parts. Each part obtained after the division may be referred to as a BP. As shown in FIG. 1, 60 M system bandwidth is divided into four parts: 10 M, 10 M, 20 M, and 20 M; and four BPs including a BP1, a BP2, a BP3, and a BP4 may be obtained. A BP subset is each part obtained after a BP is further divided. For example, the BP1 in FIG. 1 is further divided into a plurality of parts, and each part may be referred to as a subset of the BP1.

With development of communications technologies, a communications system has evolved to a 5th Generation (5G) new radio (NR) communications system. However, a fixed RBG size determined based on system bandwidth cannot meet a requirement, in 5G NR, that various communications services require different RBG sizes.

The embodiments of this application provide a method for determining an RBG size. In the method, a method for flexibly determining an RBG size depending on an actual communications service requirement is provided. For example, a network device or a terminal may determine an RBG size set including one or more RBG sizes, and determine an RBG size meeting an actual communications service requirement in the set. This meets requirements of various services to some extent, and scheduling flexibility is higher. For another example, a network device or a terminal may determine an RBG size based on control channel information, a signal transmission feature, BP information, or the like. Compared with determining of an RBG of a fixed size based only on system bandwidth, this can determine more types of RBG sizes and has higher flexibility, and therefore can meet a requirement of 5G NR.

The method and an apparatus for determining an RBG size in the embodiments of this application may be applied to a wireless communications network, and are mainly described by using a scenario of a 5G NR network among wireless communications networks as an example. It should be pointed out that the solutions in the embodiments of this application may be further applied to another wireless communications network, and a corresponding name may also be replaced with a name of a corresponding function in the another wireless communications network.

Figure 2:
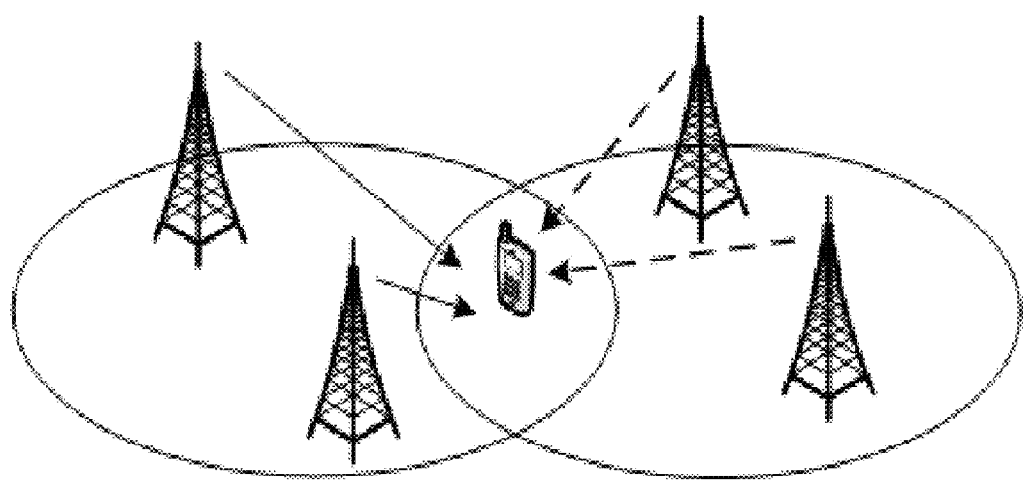
FIG. 2 is a schematic diagram of a scenario of multi-antenna site coordinated transmission or single-cell transmission.

In a main application scenario, based on existing coordinated multipoint transmission (CoMP), a multiple input multiple output (MIMO) technology that includes various technologies, such as a diversity technology for improving transmission reliability and a multi-stream technology for improving a data transmission rate, is combined with the CoMP to form a distributed multi-antenna system to better serve a user. The embodiments of this application are mainly described by using single-cell transmission as an example below. In the single-cell transmission, only one cell or one transmission point transmits data for a terminal at one scheduling moment. FIG. 2 is a schematic diagram of a scenario of multi-antenna site coordinated transmission or single-cell transmission.

It needs to be pointed out that the method and the apparatus for determining an RBG size in the embodiments of this application are applicable to scenarios of both a homogeneous network and a heterogeneous network; applicable to all of a frequency division duplex (FDD) system, a time division duplex (TDD) system, and a flexible duplex system; and applicable to both a low frequency scenario (for example, sub 6 G) and a high frequency scenario (for example, higher than 6 G). The embodiments of this application impose no limitation on a transmission point, either. Transmission may be coordinated multipoint transmission between macro base stations, coordinated multipoint transmission between micro base stations, coordinated multipoint transmission between a macro base station and a micro base station, coordinated multipoint transmission between different transmission points, coordinated multipoint transmission between different panels of a same transmission point; or coordinated multipoint transmission between terminals. This application is also applicable to communication between terminals. The following embodiments of this application are described by using communication between a network device and a terminal as an example.

Figure 3:
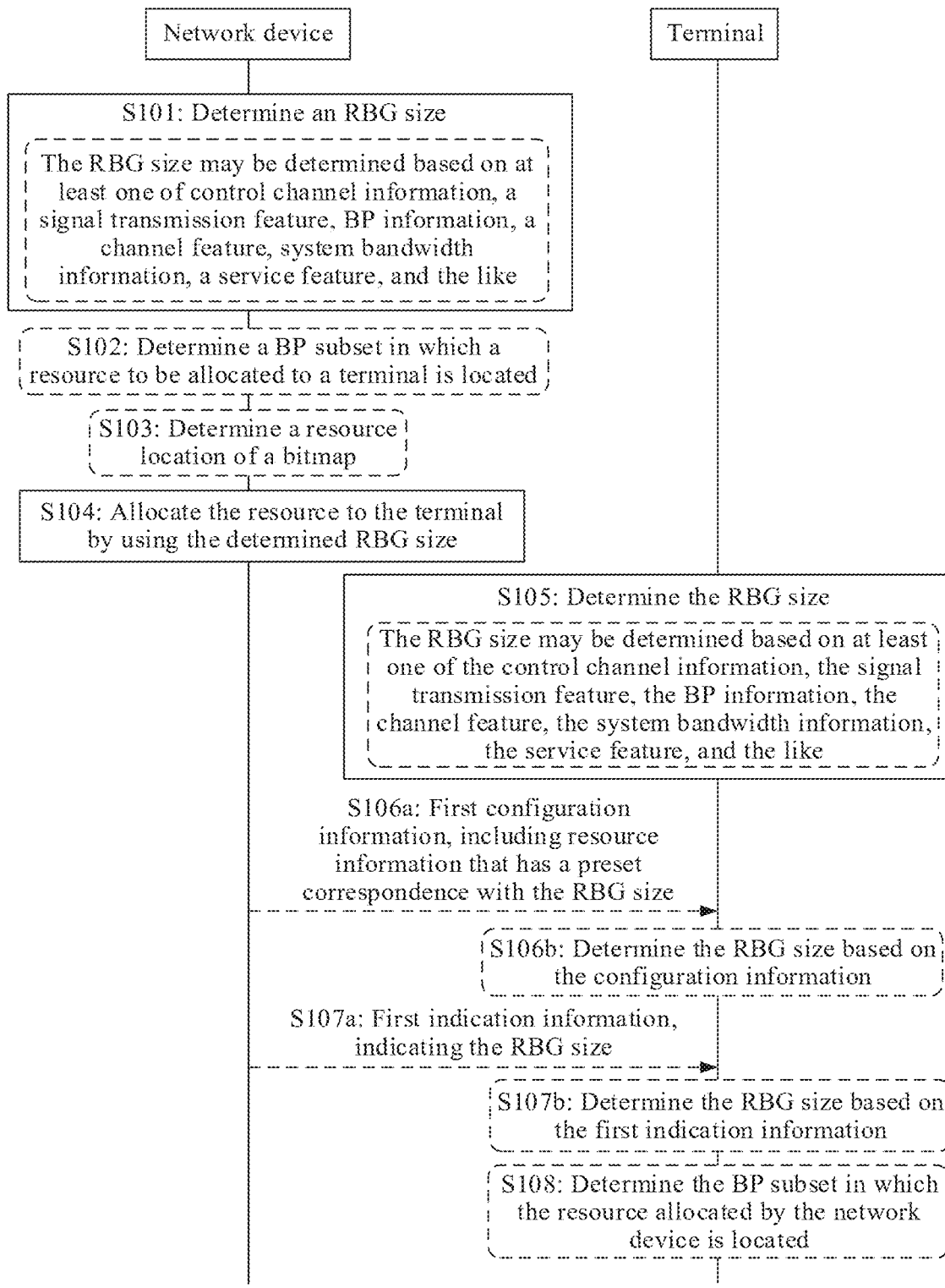
FIG. 3 is an implementation flowchart of a method for determining an RBG size according to an embodiment of this application.

FIG. 3 is an implementation flowchart of a method for determining an RBG size according to an embodiment of this application. As shown in FIG. 3, the method includes the following steps.

S101: A network device determines an RBG size.

In this embodiment of this application, the network device may determine the RBG size based on at least one of control channel information, a signal transmission feature, BP information, a channel feature, system bandwidth information, a service feature, and the like.

The control channel information includes one or a combination of the following: control channel format information, control channel content information, and control channel scrambling information. Specifically, the control channel format information may be a downlink control information format (DCI format), such as a format 1a, a format 1b, a format 1c, a format 1d, a format 2a, a format 2b, a format 2c, a format 2d, a format 3, a format 4, or a format 5 in LTE. The control channel content information is content information transmitted on a control channel, for example, may be system information, a system information block (SIB), uplink control channel information, downlink control channel information, common control information, cell-specific control information, user-level control information, or user group control information. The control channel scrambling information is information used to scramble a control channel, and may be a cell radio network temporary identifier (Cell RNTI, C-RNTI), a paging radio network temporary identifier (Paging RNTI, P-RNTI), a system information radio network temporary identifier (System information RNTI, SI-RNTI), a temporary-cell radio network temporary identifier (Temporary-Cell RNTI, T-CRNTI), a cell identifier, a user identity, a virtual cell identifier, a transmission point identifier, a virtual user identity, or the like.

The signal transmission feature may be understood as information or a channel that a resource allocated by the network device by using the determined RBG size is used to carry, where the information or the channel includes one or a combination of the following: system information, broadcast information, cell-level information, common information, user-specific information, and group information.

The channel feature may be understood as a feature of the information that the resource allocated by the network device by using the determined RBG size is used to carry. For example, the channel feature includes at least one of transmit diversity transmission, spatial multiplexing transmission, open-loop transmission, closed-loop transmission, wide-beam transmission, narrow-beam transmission, single-stream transmission, multi-stream transmission, single-cell transmission, and coordinated multipoint transmission.

The BP information includes one or a combination of the following: bandwidth information of a BP, carrier frequency information of the BP, and frame structure information of the BP. The carrier frequency information may be information about a spectrum or a frequency band in which the BP is located. The frame structure information may be a subcarrier spacing, a CP length, a quantity of symbols included in a slot, a quantity of symbols included in a mini-slot, a short transmission time, a long transmission time, slot-level scheduling, mini-slot scheduling, slot aggregated scheduling, mini-slot aggregated scheduling, slot and mini-slot aggregated scheduling, or the like.

The system bandwidth information may be understood as bandwidth information of system bandwidth, carrier frequency information of the system bandwidth, frame structure information of the system bandwidth, or the like. Understanding of the carrier frequency information and the frame structure information is the same as that in the foregoing descriptions.

The service feature may be understood as at least one of a mobile broadband service, a low latency service, a high reliability service, a video service, a voice service, a real-time service, a short message service, a low latency and high reliability service, and the like.

In this embodiment of this application, an RBG size corresponding to each piece of control channel information, each signal transmission feature, each BP, each channel feature, each piece of system bandwidth information, each service feature, or the like may be preset. Further, the network device may directly determine a corresponding RBG size based on at least one of control channel information for scheduling, a signal transmission feature, BP information, a channel feature, system bandwidth information, and a service feature, or the like.

For example, the foregoing implementation process of determining the RBG size by the network device is described by using an example in which the RBG size is determined based on the control channel format information.

First, a correspondence between each control channel format and an RBG size is preset. For example, an RBG size corresponding to a DCI format 1a may be preset to eight RBs or six RBs. An RBG size for a DCI format 1C may be preset to eight RBs or four RBs. An RBG size for a DCI format 2C, a DCI format 2D, or the like may be preset to one of eight RBs, six RBs, four RBs, three RBs, two RBs, and one RB.

It may be understood that, in this embodiment of this application, an RBG size corresponding to each control channel format may be set depending on an actual situation. The foregoing descriptions are merely examples and shall not be construed as a limitation.

Next, an RBG size is determined based on a control channel format that needs to be used for scheduling. For example, when the network device determines that the control channel format that needs to be used for scheduling is the DCI format 1a, it may be determined that the RBG size is eight RBs. For another example, when the network device determines that the control channel format that needs to be used for scheduling is the DCI format 1C, if a preset RBG size for the DCI format 1C is eight RBs, the network device may determine that the RBG size is eight RBs; or if a preset RBG size for the DCI format 1C is four RBs, the network device may determine that the RBG size is four RBs.

For example, the foregoing implementation process of determining the RBG size by the network device is described by using an example in which the RBG size is determined based on the signal transmission feature.

First, a correspondence between each signal transmission feature, signal, or channel and an RBG size is preset. For example, an RBG size corresponding to system information/a channel may be preset to eight RBs or six RBs. An RBG size for a broadcast channel may be preset to either eight RBs or four RBs. An RBG size for a unicast channel, a physical downlink shared channel, a physical uplink shared channel, or the like may be preset to one of eight RBs, six RBs, four RBs, three RBs, two RBs, and one RB.

It may be understood that, in this embodiment of this application, an RBG size corresponding to each signal transmission feature may be set depending on an actual situation. The foregoing descriptions are merely examples and shall not be construed as a limitation.

Next, an RBG size is determined based on a transmission feature of signal that needs to be scheduled. For example, when the network device determines that the transmission feature of signal that needs to be scheduled is the system information, it may be determined that the RBG size is eight RBs or six RBs. For another example, when the network device determines that the transmission feature of signal that needs to be scheduled is the broadcast channel, if a preset RBG size for the broadcast channel is eight RBs, the network device may determine that the RBG size is eight RBs; or if a preset RBG size for the broadcast channel is four RBs, the network device may determine that the RBG size is four RBs. For another example, when the network device determines that the transmission feature of signal that needs to be scheduled is the unicast channel, if a preset RBG size for the unicast channel is eight RBs, the network device may determine that the RBG size is eight RBs; or if a preset RBG size for the unicast channel is four RBs, the network device may determine that the RBG size is four RBs.

For example, the foregoing implementation process of determining the RBG size by the network device is described by using an example in which the RBG size is determined based on the signal transmission feature and the control channel format information.

First, a correspondence between an RBG size and each signal transmission feature, signal, or channel, and control channel format is preset. For example, an RBG size corresponding to system information/a channel and a control channel format 1a may be preset to eight RBs or six RBs. An RBG size for a broadcast channel and the control channel format 1 a may be preset to eight RBs or four RBs. An RBG size for a unicast channel, a physical downlink shared channel, a physical uplink shared channel, or the like and the control channel format 1a may be preset to eight RBs or six RBs. An RBG size for a unicast channel, a physical downlink shared channel, a physical uplink shared channel, or the like and the control channel format 2d may be preset to one of four RBs, three RBs, two RBs, and one RB.

It may be understood that, in this embodiment of this application, an RBG size corresponding to each combination of a signal transmission feature and a control channel format may be set depending on an actual situation. The foregoing descriptions are merely examples and shall not be construed as a limitation.

Next, an RBG size is determined based on a transmission feature of signal that needs to be scheduled, and a control channel format. For example, when the network device determines that the transmission feature of signal that needs to be scheduled is the system information, and the control channel format is the format 1a, the network device may determine that the RBG size is eight RBs or six RBs. For another example, when the network device determines that the transmission feature of signal that needs to be scheduled is the broadcast channel, and the control channel format is the format 1 a, if a preset RBG size for the broadcast channel and the control channel format 1a is eight RBs, the network device may determine that the RBG size is eight RBs; or if a preset RBG size for the broadcast channel and the control channel format 1a is four RBs, the network device may determine that the RBG size is four RBs. For another example, when the network device determines that the transmission feature of signal that needs to be scheduled is the unicast channel, and the control channel format is the format 1a, if a preset RBG size for the unicast channel and the control channel format 1a is eight RBs, the network device may determine that the RBG size is eight RBs; or if a preset RBG size for the unicast channel and the control channel format 1a is four RBs, the network device may determine that the RBG size is four RBs. For another example, when the network device determines that the transmission feature of signal that needs to be scheduled is the unicast channel, and the control channel format is the format 2d, if a preset RBG size for the unicast channel and the control channel format 2d is four RBs, the network device may determine that the RBG size is four RBs; or if a preset RBG size for the unicast channel and the control channel format 2d is one RB, the network device may determine that the RBG size is one RB.

It should be noted that a method for determining an RBG size based only on one piece of other information or determining an RBG size based on a combination of other information is similar to that in the foregoing embodiment. A specific implementation process is not described herein again.

In this embodiment of this application, according to the foregoing manners of determining an RBG size, a corresponding RBG size may be determined depending on an actual service scheduling requirement, instead of determining a same RBG size for all services under specific system bandwidth, thereby improving resource scheduling flexibility to some extent.

S102: The network device determines a BP subset in which a resource to be allocated to a terminal is located.

In this embodiment of this application, the network device determines the BP subset in which the resource to be allocated to the terminal is located, so that the network device can accurately determine a resource location of a bitmap, and further accurately allocate the resource to the terminal.

In a possible implementation, in a process of determining the BP subset by the network device, the BP subset may be determined in a manner similar to the foregoing manners of determining an RBG size. For example, a BP subset corresponding to each piece of control channel information, each signal transmission feature, each BP, each channel feature, each piece of system bandwidth information, each service feature, or the like may be preset. Further, the network device may directly determine a corresponding BP subset based on at least one of control channel information for scheduling, a signal transmission feature, BP information, each channel feature, each piece of system bandwidth information, and each service feature, and the like.

For example, the foregoing implementation process of determining the BP subset by the network device is described by using an example in which the BP subset is determined based on the control channel format information. First, a correspondence between each control channel format and a BP subset is preset. For example, a BP subset corresponding to the DCI format 1a may be preset to an entire BP. A BP subset for the DCI format 1C may be preset to 1 BP or ½ of a BP. A BP subset for the DCI format 2C, the DCI format 2D, or the like may be preset to 1 BP, ½ of a BP, ¼ of a BP, or ⅛ of a BP.

It may be understood that, in this embodiment of this application, a BP subset corresponding to each control channel format may be set depending on an actual situation. The foregoing descriptions are merely examples and shall not be construed as a limitation.

Next, a BP subset is determined based on a control channel format that needs to be used for scheduling. For example, when the network device determines that the control channel format that needs to be used for scheduling is the DCI format 1 a, it may be determined that the BP subset is an entire BP. For another example, when the network device determines that the control channel format that needs to be used for scheduling is the DCI format 1C, if a preset BP subset for the DCI format 1C is 1 BP, the network device may determine that the BP subset is the entire BP; or if a preset BP subset for the DCI format 1C is ½ of a BP, the network device may determine that the BP subset is ½ of the BP.

Figure 4:
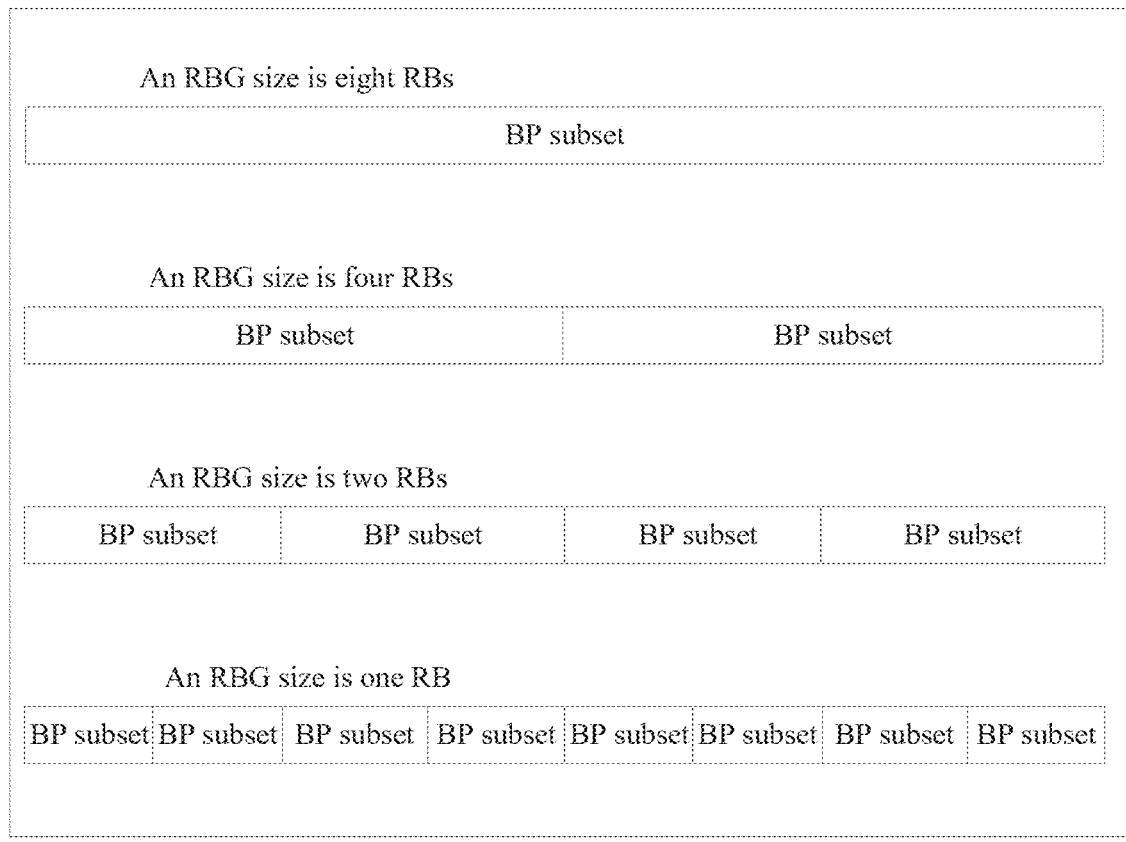
FIG. 4 is a schematic diagram of a BP subset according to an embodiment of this application.

In another possible implementation, the network device may alternatively determine a size of the BP subset based on the RBG size. A correspondence between an RBG size and a BP subset may be determined according to a specific resource scheduling requirement. For example, still using the control channel format as an example for description, if a control channel format for scheduling is the DCI format 2C or the DCI format 2D, and the RBG size is eight RBs, it may be determined that the BP subset is an entire BP; or if the RBG size is four RBs, it may be determined that the BP subset is ½ of a BP; or if the RBG size is two RBs, it may be determined that the BP subset is ¼ of a BP; or if the RBG size is one RB, it may be determined that the BP subset is ⅛ of a BP, as shown in FIG. 4.

In this embodiment of this application, the network device may determine one of the RBG size and the BP subset in the foregoing manners, and the other one may be determined in a manner of signaling notification, for example, in a manner of notification by using higher layer signaling or physical layer signaling. This is not limited herein. The higher layer signaling may be Radio Resource Control (RRC) signaling, a Media Access Control (MAC) control element (CE), or other signaling. This is not specifically limited herein. The physical layer signaling may be downlink control information or the like.

Figure 5:
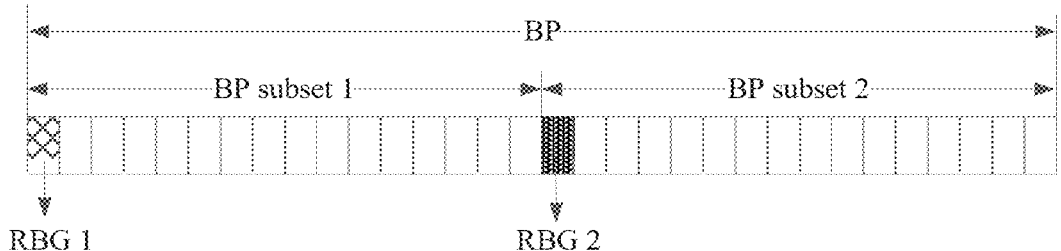
FIG. 5 is a schematic diagram of a BP subset that includes a plurality of continuous RBs according to an embodiment of this application.
Figure 6:
FIG. 6 is a schematic diagram of a BP subset that includes a plurality of discontinuous RBs according to an embodiment of this application.

In a possible example, the BP subset in this embodiment of this application may include a plurality of continuous or discontinuous RBs. An example in which the RBG size is four RBs and the BP subset is ½ of a BP is used for description. FIG. 5 is a schematic diagram in which a BP subset includes a plurality of continuous RBs. FIG. 6 is a schematic diagram in which a BP subset includes a plurality of discontinuous RBs.

In this embodiment of this application, the BP subset includes a plurality of discontinuous RBs. This can mitigate resource fragmentation to some extent and can also improve a diversity gain. For example, when the network device performs resource allocation, if a BP subset includes continuous RBs, and a few resources remain in one subset and a few resources also remain in another subset, resources in different subsets cannot be allocated to one terminal, thereby causing resource fragmentation. However, if a BP subset can be continuous or discontinuous, during resource allocation, if a few resources remain in one subset and a few resources also remain in another subset, discontinuous RBs may form a BP subset, and therefore a plurality of discontinuous resources may be allocated to one terminal, thereby mitigating resource fragmentation. For the diversity gain, if a BP subset can be discontinuous RBs, during resource allocation, RBs at different locations may be allocated to one terminal. Because the RBs at different locations have different channel features, a frequency diversity gain can be provided and communication performance can be improved.

In another possible embodiment of this application, an RBG determined by the network device may include a plurality of continuous or discontinuous RBs. In other words, the RBG may be continuous or discontinuous.

In this embodiment of this application, a continuous or discontinuous RBG may be combined with a continuous or discontinuous BP subset in the following cases:

A: Continuous RBs form an RBG, and continuous RBs/RBGs form a BP subset.

B: Continuous RBs form an RBG, and discontinuous RBs/RBGs form a BP subset.

C: Discontinuous RBs form an RBG, and continuous RBs/RBGs form a BP subset.

D: Discontinuous RBs form an RBG, and discontinuous RBs/RBGs form a BP subset.

Further, in this embodiment of this application, if discontinuous RBs form an RBG, the RBG formed by the discontinuous RBs may be located in a same BP subset, or may be located in different BP subsets. For example, there may be the following cases:

E: Discontinuous RBs form an RBG, continuous RBs form a BP subset, and the RBG is located in a same BP subset.

F: Discontinuous RBs form an RBG, discontinuous RBs form a BP subset, and the RBG is located in a same BP subset.

G: Discontinuous RBs form an RBG, continuous RBs form a BP subset, and the RBG is located in different BP subsets.

H: Discontinuous RBs form an RBG, discontinuous RBs form a BP subset, and the RBG is located in different BP subsets.

This application describes the foregoing cases with reference to actual application. This embodiment of this application is described by using an example in which it is assumed that eight RBs form a BP, a BP subset is ½ of the BP, and each RBG includes four RBs.

Figure 7:
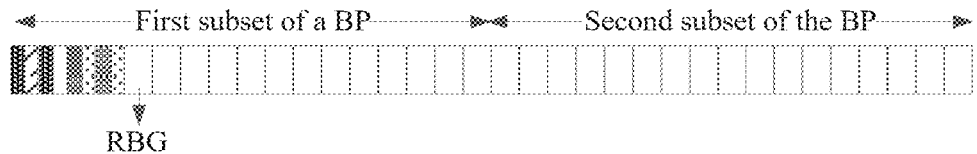
FIG. 7 is a schematic diagram of BP subset resource allocation according to an embodiment of this application.

FIG. 7 is a schematic diagram of BP subset resource allocation according to an embodiment of this application. In FIG. 7, subsets of a BP include a first subset of the BP and a second subset of the BP, and both the first subset of the BP and the second subset of the BP are continuous. The first subset of the BP includes discontinuous RBGs with a spacing of two RBs. The second subset of the BP includes continuous RBGs, and the RBGs are located in a same BP subset.

Figure 8:
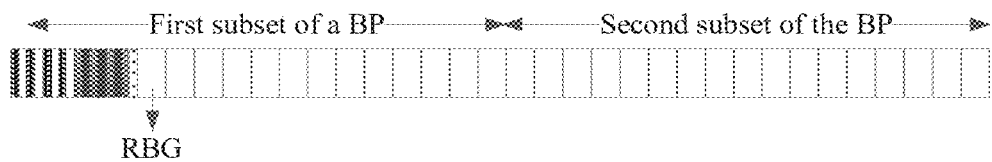
FIG. 8 is another schematic diagram of BP subset resource allocation according to an embodiment of this application.

FIG. 8 is another schematic diagram of BP subset resource allocation according to an embodiment of this application. In FIG. 8, subsets of a BP include a first subset of the BP and a second subset of the BP, and both the first subset of the BP and the second subset of the BP are continuous. The first subset of the BP includes discontinuous RBGs with a spacing of one RB. The second subset of the BP includes continuous RBGs, and the RBGs are located in a same BP subset.

Figure 9:
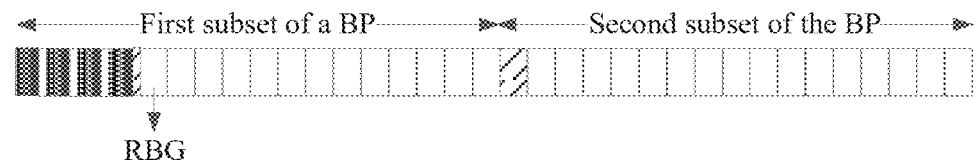
FIG. 9 is still another schematic diagram of BP subset resource allocation according to an embodiment of this application.

FIG. 9 is still another schematic diagram of BP subset resource allocation according to an embodiment of this application. In FIG. 9, subsets of a BP include a first subset of the BP and a second subset of the BP, and both the first subset of the BP and the second subset of the BP are continuous. The first subset of the BP includes discontinuous RBGs with a spacing of three RBs. The second subset of the BP includes continuous RBGs, and the RBGs are located in a same BP subset.

Figure 10:
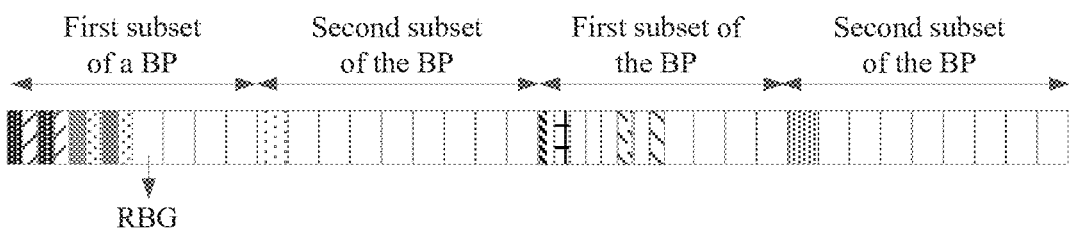
FIG. 10 is yet another schematic diagram of BP subset resource allocation according to an embodiment of this application.

FIG. 10 is still another schematic diagram of BP subset resource allocation according to an embodiment of this application. In FIG. 10, subsets of a BP include a first subset of the BP and a second subset of the BP, and both the first subset of the BP and the second subset of the BP are discontinuous. The discontinuous first subset of the BP includes discontinuous RBGs with a spacing of two RBs. The discontinuous second subset of the BP includes continuous RBGs, and the RBGs are located in a same BP subset.

Figure 11:
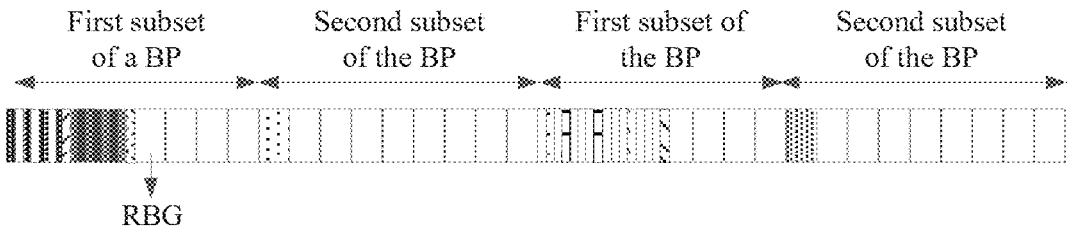
FIG. 11 is still yet another schematic diagram of BP subset resource allocation according to an embodiment of this application.

FIG. 11 is still another schematic diagram of BP subset resource allocation according to an embodiment of this application. In FIG. 11, subsets of a BP include a first subset of the BP and a second subset of the BP, and both the first subset of the BP and the second subset of the BP are discontinuous. The discontinuous first subset of the BP includes discontinuous RBGs with a spacing of one RB. The discontinuous second subset of the BP includes continuous RBGs, and the RBGs are located in a same BP subset.

Figure 12:
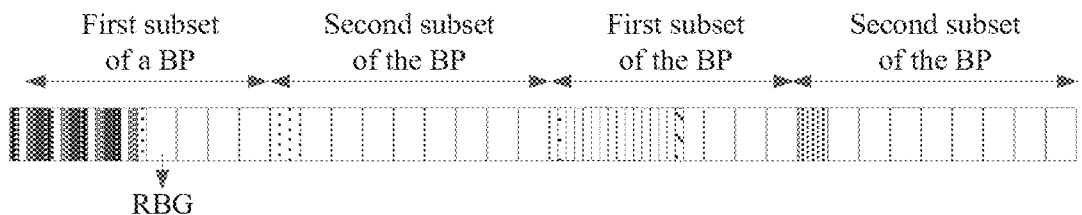
FIG. 12 is a further schematic diagram of BP subset resource allocation according to an embodiment of this application.

FIG. 12 is still another schematic diagram of BP subset resource allocation according to an embodiment of this application. In FIG. 12, subsets of a BP include a first subset of the BP and a second subset of the BP, and both the first subset of the BP and the second subset of the BP are discontinuous. The discontinuous first subset of the BP includes discontinuous RBGs with a spacing of three RBs. The discontinuous second subset of the BP includes continuous RBGs, and the RBGs are located in a same BP subset.

Figure 13:
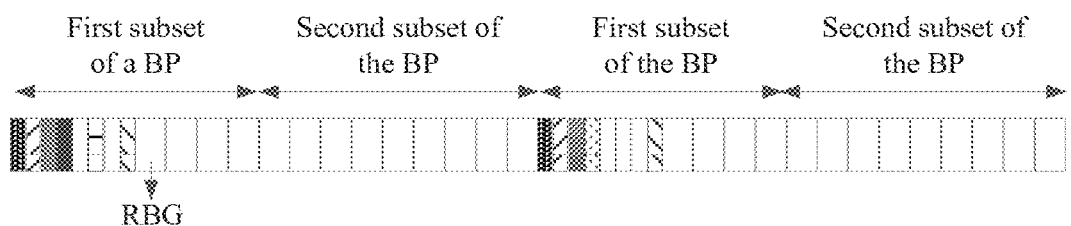
FIG. 13 is a still further schematic diagram of BP subset resource allocation according to an embodiment of this application.

FIG. 13 is still another schematic diagram of BP subset resource allocation according to an embodiment of this application. In FIG. 13, subsets of a BP include a first subset of the BP and a second subset of the BP, and both the first subset of the BP and the second subset of the BP are discontinuous. In the discontinuous first subset of the BP, part (half) of RBs in a discontinuous RBG are located in a first part of the first subset of the BP, and the other part (the other half) of the RBs in the discontinuous RBG are located in a second part of the first subset of the BP. In addition, each part (half) of RBs, of the RBG, in the first part and the second part of the first subset of the BP are continuous. The discontinuous second subset of the BP includes continuous RBGs. The RBGs are located in different BP subsets.

Figure 14:
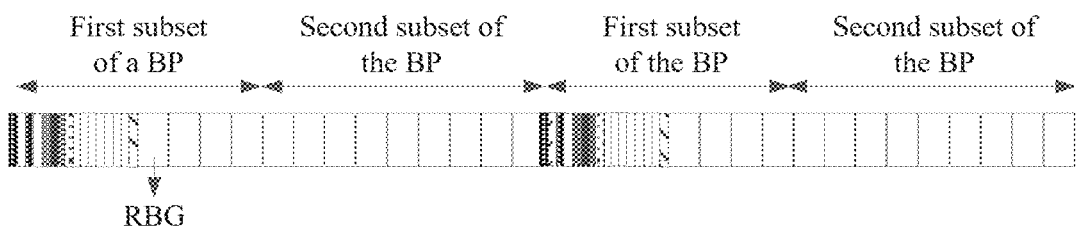
FIG. 14 is a yet further schematic diagram of BP subset resource allocation according to an embodiment of this application.

FIG. 14 is still another schematic diagram of BP subset resource allocation according to an embodiment of this application. In FIG. 14, subsets of a BP include a first subset of the BP and a second subset of the BP, and both the first subset of the BP and the second subset of the BP are discontinuous. In the discontinuous first subset of the BP, part (half) of RBs in a discontinuous RBG are located in a first part of the first subset of the BP, and the other part (the other half) of the RBs in the discontinuous RBG are located in a second part of the first subset of the BP. In addition, each part (half) of RBs, of the RBG, in the first part and the second part of the first subset of the BP are formed by discontinuous RBs at a spacing of one RB. The discontinuous second subset of the BP includes continuous RBGs. The RBGs are located in different BP subsets.

Figure 15:
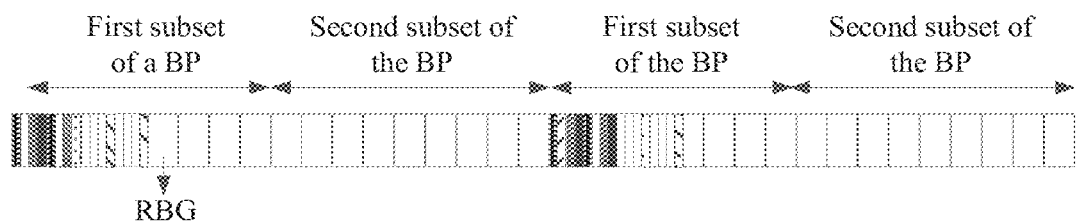
FIG. 15 is a still yet further schematic diagram of BP subset resource allocation according to an embodiment of this application.

FIG. 15 is still another schematic diagram of BP subset resource allocation according to an embodiment of this application. In FIG. 15, subsets of a BP include a first subset of the BP and a second subset of the BP, and both the first subset of the BP and the second subset of the BP are discontinuous. In the discontinuous first subset of the BP, part (half) of RBs in a discontinuous RBG are located in a first part of the first subset of the BP, and the other part (the other half) of the RBs in the discontinuous RBG are located in a second part of the first subset of the BP. In addition, each part (half) of RBs, of the RBGs, in the first part and the second part of the first subset of the BP are formed by discontinuous RBs at a spacing of three RBs. The discontinuous second subset of the BP includes continuous RBGs. The RBGs are located in different BP subsets.

Further, in a possible implementation, a combination manner of an RBG size and BP subset allocation may be implemented in a plurality of manners in this embodiment of this application. For example, when a BP subset includes continuous RBs/RBGs, and an RBG includes continuous RBs, if RBG sizes are one RB, two RBs, and four RBs, combination manners of the RBG sizes and BP subset allocation may be shown in FIG. 16. In this case, the combination manners of the RBG sizes and the BP subset allocation include a total of seven combinations. Likewise, if a similar combination manner is used, when a BP subset includes continuous RBs/RBGs, and an RBG includes continuous RBs, if RBG sizes are one RB, two RBs, four RBs, and eight RBs, combination manners of the RBG sizes and BP subset allocation include a total of 15 combinations.

Figure 17:
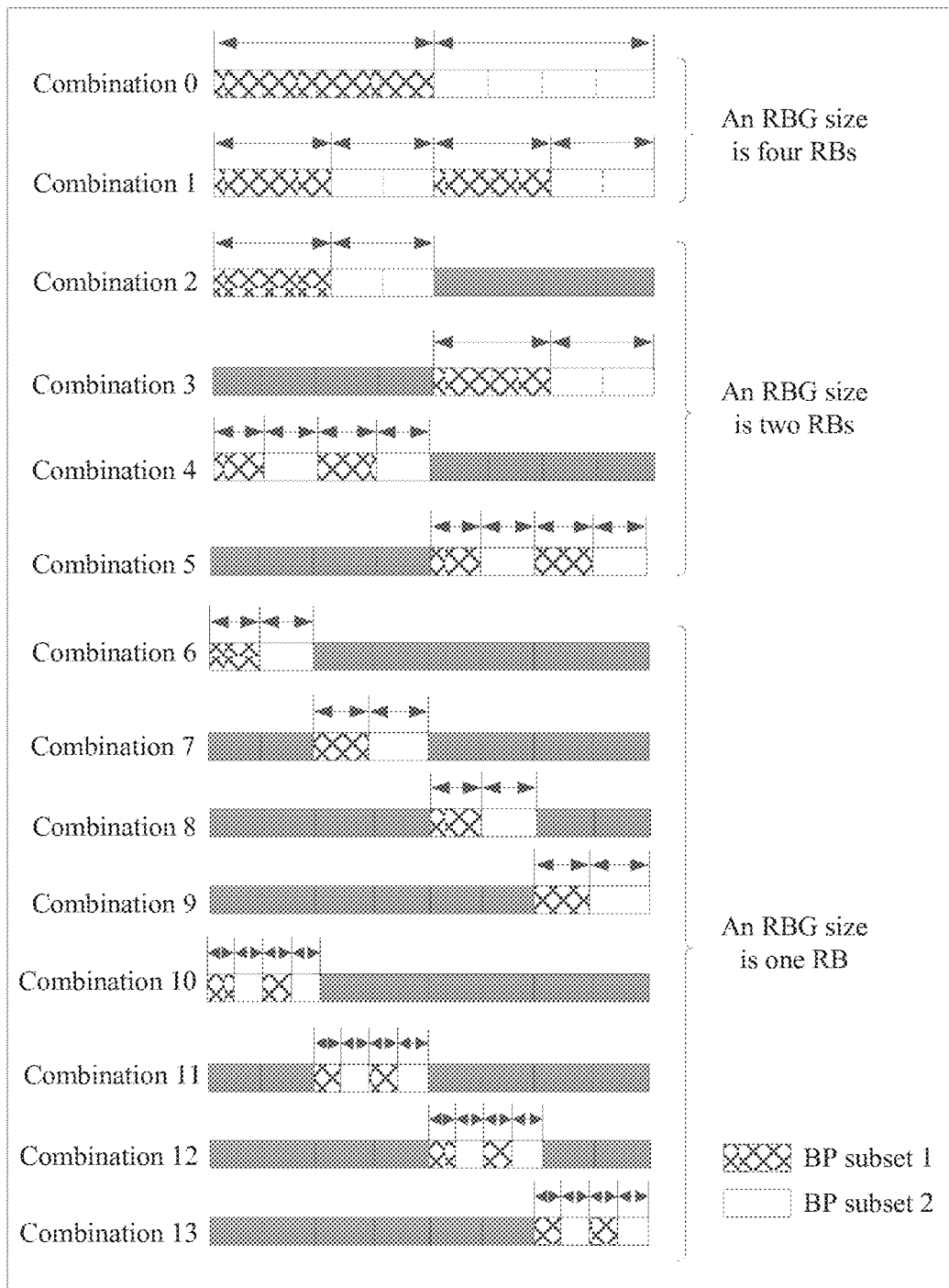
FIG. 17 is a schematic diagram of another combination manner of an RBG size and BP subset allocation according to an embodiment of this application.

When a BP subset includes discontinuous RBs/RBGs, and an RBG includes continuous RBs, if RBG sizes are one RB, two RBs, and four RBs, combination manners of the RBG sizes and BP subset allocation may be shown in FIG. 17. In FIG. 17, the combination manners of the RBG sizes and the BP subset allocation include a total of 14 combinations. Likewise, if a similar combination manner is used, when a BP subset includes continuous RBs, and an RBG includes continuous RBs, if RBG sizes are one RB, two RBs, four RBs, and eight RBs, combination manners of the RBG sizes and BP subset allocation include a total of 30 combinations.

Figure 16:
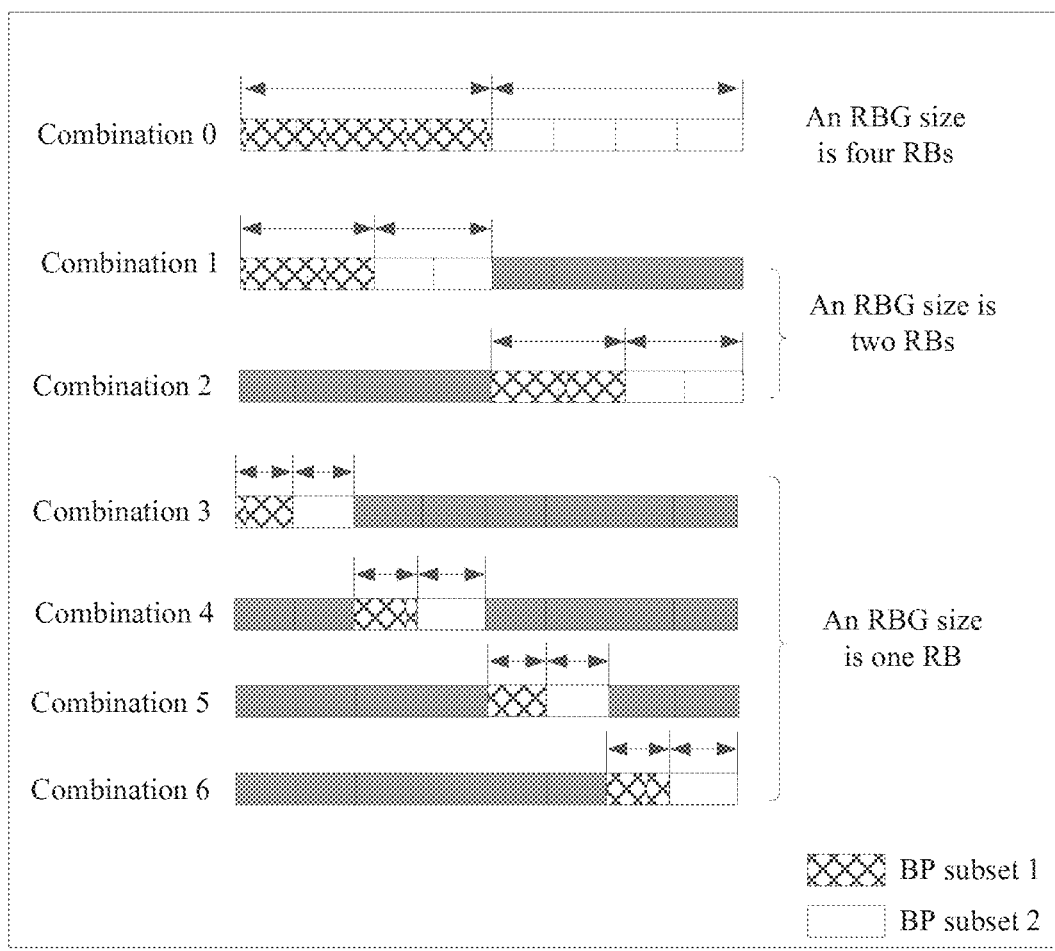
FIG. 16 is a schematic diagram of a combination manner of an RBG size and BP subset allocation according to an embodiment of this application.
Figure 18:
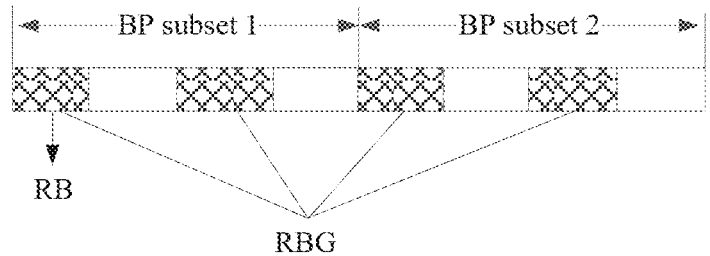
FIG. 18 is a schematic diagram of still another combination manner of an RBG size and BP subset allocation according to an embodiment of this application.

In this embodiment of this application, as shown in FIG. 16 and FIG. 17, during RBG division, continuous RBs in each BP subset form one RBG size. For example, if an RBG size is four RBs, the first four RBs of eight RBs form one RBG, and the last four RBs also form one RBG. However, in this embodiment of this application, an RBG may be discontinuous, and therefore RBs that form one RBG may be randomly selected, as shown in FIG. 18.

It may be understood that, in this embodiment of this application, a spacing between RBs in the discontinuous RBG may be predefined by a protocol, or may be determined in a manner of signaling notification. RBs at a spacing of two RBs may form one RBG, or RBs at a spacing of one RB may form one RBG, or RBs at a spacing of three RBs may form one RBG. A specific discontinuous allocation manner may be predefined by a protocol, or may be determined in a manner of signaling notification.

It may be understood that, in this embodiment of this application, subset information needs to be determined to determine the BP subset in which the resource allocated to the terminal is located. Specifically, the subset information may include at least one of a subset size, a subset resource division method, a subset quantity, and subset scheduling information.

There may be a plurality of subset resource division methods. For example, a subset resource division method may be determined based on an RBG size, or may be predefined, or may be indicated by the network device to the terminal by using signaling. Specifically, the signaling may be higher layer signaling or physical layer signaling. The higher layer signaling may be Radio Resource Control (RRC) signaling, a Media Access Control (MAC) control element (CE), or other signaling. This is not specifically limited herein. The physical layer signaling may be downlink control information or the like.

A specific subset resource division method may include: division for a continuous subset and/or division for a discontinuous subset.

Division for a continuous subset may include the following method: If a BP needs to be divided into N subsets, the BP may be equally divided into N portions, and each portion represents one subset. For example, if a BP includes 20 RBs, the first RB to the fifth RB form the first subset, the sixth RB to the tenth RB form the second subset, the eleventh RB to the fifteenth RB form the third subset, and the sixteenth RB to the twentieth RB form the fourth subset.

Division for a discontinuous subset may include a plurality of subset division methods. Specifically, a BP may be first divided into a plurality of continuous parts, and then one or more discontinuous parts may be selected as one subset. Each part includes one or more RBs/RBGs. A specific correspondence between a part and a subset may be predefined, or may be notified by using signaling. For example, a subset may be first divided into M parts, where M may be predefined or notified, or may be related to an RBG size. For example, if the RBG size is 8 (or a maximum RBG size of a system, or a currently available maximum RBG size), there may be only one part and only one subset. If the RBG size is 4 (or half of a maximum RBG size of a system, or half of a currently available maximum RBG size), four parts may be obtained through division, and there are correspondingly two subsets. The specific correspondence between a part and a subset may be as follows: The first part and the third part correspond to the first subset, and the second part and the fourth part correspond to the second subset. Alternatively, the specific correspondence between a part and a subset may be as follows: The first part and the fourth part correspond to the first subset, and the second part and the third part correspond to the second subset. The specific correspondence is not limited herein.

Figure 19:
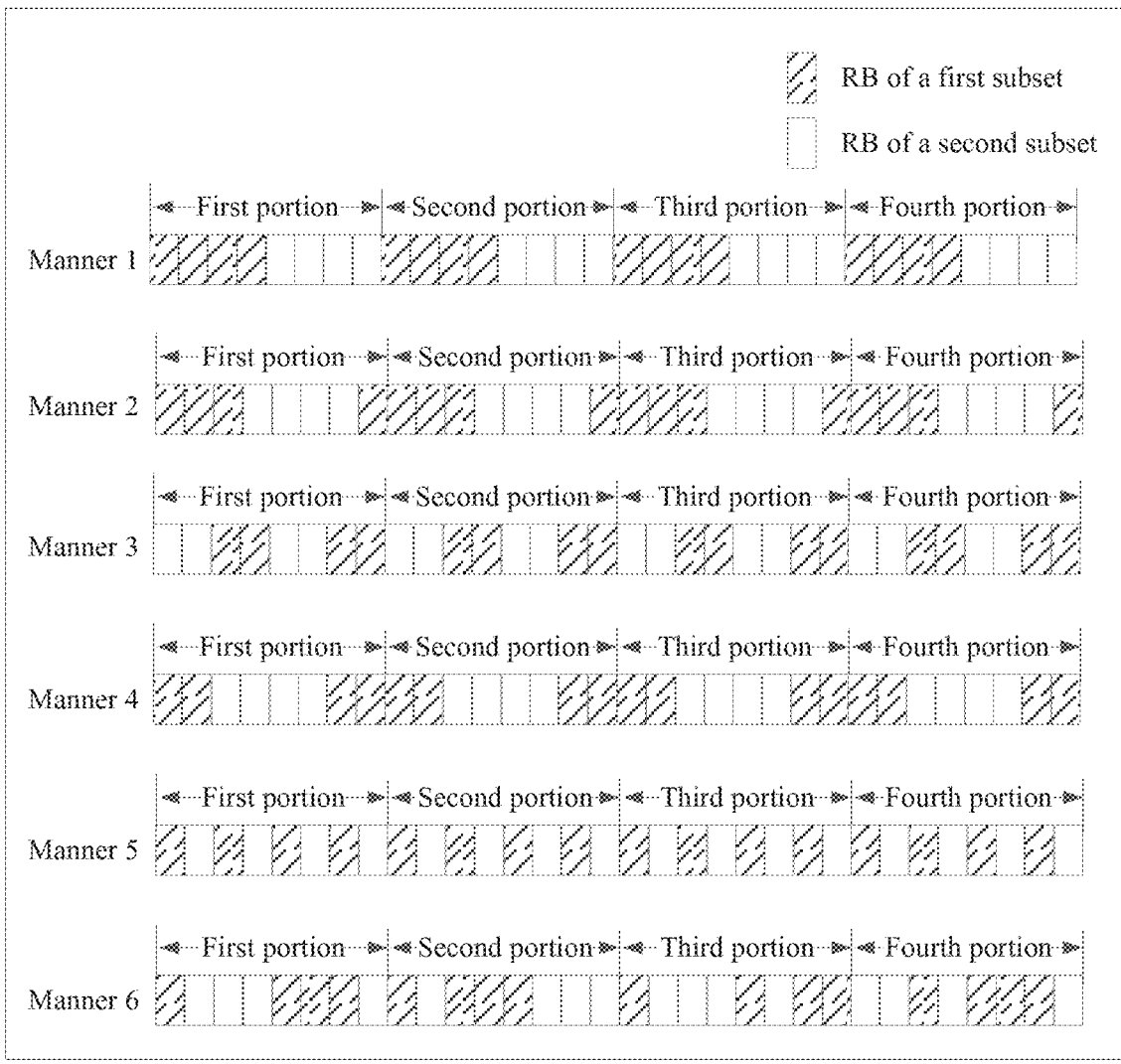
FIG. 19 is a schematic diagram of BP subset resource division according to an embodiment of this application.

Alternatively, the subset resource division method may be as follows: A BP is first divided into a plurality of RBGs. In this case, division is performed by using a maximum RBG size of a system or a currently available maximum RBG size. For example, if a BP includes 32 RBs, and the maximum RBG size of the system is eight RBs, the BP may be divided into four portions, and a BP subset is determined based on an actually used RBG size. If the actually used RBG size is eight RBs, the entire BP is one subset. If the actually used RBG size is four RBs, the BP may be divided into two subsets. There may be a plurality of implementations of selecting RBs for each subset, for example, several manners shown in FIG. 19. In a manner 1, the first four RBs in each portion form the first subset of the BP, and the last four RBs in each portion form the second subset of the BP. In a manner 2, the first three RBs and the last one RB in each portion form the first subset, and the fourth RB to the seventh RB in each portion form the second subset. In a manner 3, the second RB, the fourth RB, the seventh RB, and the eighth RB in each portion form the first subset, and the first RB, the third RB, the fifth RB, and the sixth RB in each portion form the second subset. In a manner 4, the first RB, the second RB, the seventh RB, and the eighth RB in each portion form the first subset, and the third RB, the fourth RB, the fifth RB, and the sixth RB in each portion form the second subset. In a manner 5, the first RB, the third RB, the fifth RB, and the seventh RB in each portion form the first subset, and the second RB, the fourth RB, the sixth RB, and the eighth RB in each portion form the second subset. It can be learned from the foregoing manners that, in this embodiment of this application, RBs in each subset may be randomly selected from each portion. In the foregoing manners, locations of RBs in different portions are consistent. However, in an actual implementation process, locations of RBs in portions forming a same subset may be inconsistent. For example, in a manner 6, the first subset may be formed by the first RB, the fifth RB, the sixth RB, and the seventh RB in the first portion, the first RB, the third RB, the fourth RB, and the fifth RB in the second portion, the first RB, the fifth RB, the seventh RB, and the eighth RB in the third portion, and the third RB, the fifth RB, the sixth RB, and the seventh RB in the fourth portion; and the second subset may be formed by the second RB, the third RB, the fourth RB, and the eighth RB in the first portion, the second RB, the sixth RB, the seventh RB, and the eighth RB in the second portion, the second RB, the third RB, the fourth RB, and the sixth RB in the third portion, and the first RB, the second RB, the fourth RB, and the eighth RB in the fourth portion. Therefore, in this embodiment of this application, the RBs in each subset are randomly selected, and the locations of the RBs in different portions may be the same or may be different. In this embodiment of this application, examples are not listed one by one herein.

Further, the foregoing subset division method may be predefined, or may be notified by using signaling.

Optionally, a quantity of subsets obtained through division may be predefined, or may be notified by using signaling. Alternatively, a quantity of subsets obtained through division may be determined based on an RBG size. For example, the quantity of subsets obtained through division may be a numerical value obtained by rounding up a value obtained by dividing BP bandwidth by an RBG size. For example, if a BP includes 32 RBs, and an RBG size is fourth RBs, the BP may be divided into eight subsets; or if a BP includes 32 RBs, and an RBG size is two RBs, the BP may be divided into 16 subsets.

Optionally, which subset or subsets is/are specifically scheduled may be predefined, or may be notified by using signaling. A specific indication method may be: indicating an identifier of a subset, or indicating a subset bitmap.

For example, an example of indicating an identifier of a subset is as follows: If a BP is divided into eight subsets, each subset is identified by a sequence number, and one subset is scheduled, an identifier of a specific subset in the eight subsets may be indicated. For example, three bits are used for indication. For example, 000 represents the first subset, 001 represents the second subset, 010 represents the third subset, 011 represents the fourth subset, 100 represents the fifth subset, 101 represents the sixth subset, 110 represents the seventh subset, and 111 represents the eighth subset.

For example, an example of indicating a subset bitmap is as follows: Four subsets are obtained through division, and four bits may be used to indicate a bitmap. For example, the first bit represents the first subset, the second bit represents the second subset, the third bit represents the third subset, and the fourth bit represents the fourth subset. A bit value 0 indicates that a subset is not selected, and a bit value 1 indicates that a subset is selected. Certainly, alternatively, a bit value 0 may indicate that a subset is selected, and a bit value 1 may indicate that a subset is not selected. If the bit value 0 indicates that a subset is not selected, and the bit value 1 indicates that a subset is selected, 0000 represents that there is no subset, 0001 represents the fourth subset, 0010 represents the third subset, 0100 represents the second subset, 1000 represents the first subset, 0011 represents the third subset and the fourth subset, 1100 represents the first subset and the second subset, 1001 represents the first subset and the fourth subset, 1010 represents the first subset and the third subset, 0101 represents the second subset and the fourth subset, 0110 represents the second subset and the third subset, 0111 represents the second subset, the third subset, and the fourth subset, 1011 represents the first subset, the third subset, and the fourth subset, 1110 represents the first subset, the second subset, and the third subset, 1101 represents the first subset, the second subset, and the fourth subset, and 1111 represents the first subset, the second subset, the third subset, and the fourth subset. Certainly, alternatively, there may be another indication manner in this embodiment of this application. This is not limited in this embodiment of this application. Other possibilities are not described herein again.

Alternatively, optionally, the RBG size may be determined according to an indicated subset division method or based on currently indicated subset information. For example, if one subset is obtained through division, the RBG size is 8; or if two subsets are obtained through division, the RBG size is 4.

In addition, in a resource allocation method for BP aggregation, locations of specific BPs may be indicated, and then further allocation of resources in each BP is indicated. In addition, an RBG may cross BPs. BP subset resource allocation may be performed on resources of a plurality of BPs in a unified manner. In other words, a BP subset may cross BPs. This is not specifically limited herein.

Further, it may be understood that, in this embodiment of this application, step S102 for determining the BP subset is an optional step.

S103: The network device determines a resource location of a bitmap.

In this embodiment of this application, the network device may determine the resource location of the bitmap based on the determined RBG size and BP subset.

In this embodiment of this application, a process of determining the resource location of the bitmap by the network device may be implemented by using a current existing technology. For example, if the terminal determines that BP subset information is full bandwidth, and the RBG size is eight RBs, the network device may determine that the first bit in the bitmap represents the first RBG, the second bit represents the second RBG, and so on, and each RBG, except the last RBG, includes eight RBs. Therefore, a total quantity of RBs may not be a multiple of 8.

For another example, if the network device determines that the BP subset is ½ of a BP, and the RBG size is four RBs, the network device may determine meanings of bits in the bitmap. For example, if the BP subset is the second subset, namely, the last half of resources, the first bit in the bitmap represents the first RBG in the last half of resources, the second bit represents the second RBG in the last half of resources, and so on, and each RBG, except the last RBG, includes four RBs. Therefore, a total quantity of RBs may not be a multiple of 4.

S104: The network device allocates the resource to the terminal by using the determined RBG size.

In this embodiment of this application, the network device may allocate, at the corresponding determined resource location of the bitmap, the resource to the terminal by using the determined RBG size.

In this embodiment of this application, the network device may determine, according to a specific service scheduling requirement, to use one or both of the manner of determining the RBG size and resource scheduling and the manner of determining the BP subset and the RBG size, thereby improving scheduling flexibility to some extent.

In this embodiment of this application, the foregoing implementation process of determining an RBG size by the network device may be understood as an implicit method for determining an RBG size, or certainly, an RBG size may be determined in an explicit manner. For example, another device sends signaling to the network device, to indicate a specific RBG size, or indicate a resource that needs to be scheduled by the network device, where there is a preset correspondence between the to-be-scheduled resource and an RBG size.

It should be noted that, in the following descriptions in this embodiment of this application, the determining in an implicit manner is: determining in a manner of predefinition, for example, stipulation by a protocol; and the determining in an explicit manner is: determining in a manner of indication by using signaling information.

S105: The terminal determines the RBG size.

In this embodiment of this application, the terminal may determine the RBG size in an implicit manner similar to that used by the network device. Details are not described herein again.

In this embodiment of this application, the terminal may alternatively determine the RBG size in an explicit manner. In this scenario, the network device may send configuration information or indication information to the terminal.

S106a: The network device sends first configuration information to the terminal, where the first configuration information includes resource information that has a preset correspondence with an RBG size, for example, at least one of control channel information, a signal transmission feature, BP information, each channel feature, each piece of system bandwidth information, and each service feature.

S106b: The terminal receives the configuration information sent by the network device, and determines the RBG size based on the configuration information.

In this embodiment of this application, the terminal may preset an RBG size corresponding to each piece of control channel information, each signal transmission feature, each BP, or the like. After receiving the configuration information sent by the network device, the terminal may directly determine the RBG size based on at least one of control channel information, a signal transmission feature, BP information, each channel feature, each piece of system bandwidth information, and each service feature that are included in the configuration information and that have preset correspondences with RBG sizes, and the like.

S107a: The network device sends first indication information to the terminal, where the first indication information is used to indicate the RBG size.

In this embodiment of this application, after determining, in the foregoing manner, an RBG size occupied by the allocated resource, the network device may directly send, to the terminal, the first indication information used to indicate the RBG size occupied by the allocated resource.

S107b: The terminal receives the first indication information sent by the network device, and determines the RBG size based on the first indication information.

It may be understood that, in this embodiment of this application, either the implementation of determining the RBG size by the terminal based on the configuration information in S105a and S105b, or the implementation of determining the RBG size by the terminal based on the configuration information in S106a and S106b may be executed.

Further, in this embodiment of this application, the method may further include the following step.

S108: The terminal determines the BP subset in which the resource allocated by the network device is located, so as to determine the resource location of the bitmap.

The terminal may implicitly determine the BP subset in a manner similar to that of implicitly determining the BP subset by the network device; or may determine a size of the BP subset based on the RBG size. A specific implementation process is similar to that of determining the BP subset by the network device. Details are not described herein again.

In a possible example, the terminal may alternatively determine the BP subset in an explicit manner. For example, the network device may send second indication information to the terminal, where the second indication information is used to indicate BP subset information. The terminal receives the second indication information sent by the network device, and may determine the BP subset information based on the second indication information.

In another possible example, the network device may further send third indication information to the terminal, where the third indication information is used to indicate that the BP subset includes continuous or discontinuous RBs.

In still another possible example, the network device may further send fourth indication information to the terminal, where the fourth indication information is used to indicate that an RBG includes continuous or discontinuous RBs.

In this embodiment of this application, at least one of four processes, in which the terminal determines the RBG size, determines whether an RBG is continuous, determines the BP subset, and determines whether the BP subset is continuous, may be performed in an implicit or explicit manner. This is not limited in this embodiment of this application.

In the implementation processes in which the terminal determines the RBG size, determines whether an RBG is continuous, determines the BP subset, and determines whether the BP subset is continuous in the explicit manner, the first indication information, the second indication information, the third indication information, and the fourth indication information may be separately indicated by the network device to the terminal, or at least two of the four pieces of indication information may be indicated together. In a possible embodiment, the network device may indicate the first indication information, the second indication information, the third indication information, and the fourth indication information together by using a same information element.

In a possible implementation, in this embodiment of this application, BP resource allocation may be indicated in a manner of indicating the bitmap by using a bit in a protocol header of the bitmap, or BP resource allocation may be indicated in a manner of indicating a BP subset allocation index by using a bit.

This application describes indication processes in various cases of BP resource allocation with reference to actual application.

In this embodiment of this application, one bit in the protocol header of the bitmap may be used to indicate whether a currently scheduled BP subset is continuous or discontinuous, for example, a bit 0 represents the currently scheduled BP subset is continuous, and a bit 1 represents the currently scheduled BP subset is discontinuous. When a value of the bit is 1, it indicates that discontinuous RBs form the BP subset. A method for forming the BP subset by the discontinuous RBs may be predefined by a protocol, or may be configured by using signaling, for example, may be configured by using Radio Resource Control (RRC) signaling.

In this embodiment of this application, three bits may alternatively be used to separately indicate the BP subset and whether an RBG is continuous. For example, the first bit indicates that the BP subset is the first subset of a BP or the second subset of the BP, and the second bit indicates whether four continuous RBs form one RBG or discontinuous RBs (for example, at a spacing of two RBs) form one RBG. For example, a resource allocation manner of the first subset of the BP is as follows: The first subset of the BP includes discontinuous RBGs. A resource allocation manner of the second subset of the BP is as follows: The second subset of the BP includes continuous RBGs. If a value of the first bit is 0, the first bit represents the first subset of the BP; or if a value of the first bit is 1, the first bit represents the second subset of the BP. If a value of the second bit is 0, it represents a continuous RBG; or if a value of the second bit is 1, it represents a discontinuous RBG. Then allocation for the first subset of the BP is 01, and allocation for the second subset of the BP is 10 (or values of the bits may be contrary).

Further, alternatively, the RBG size may be independently indicated. For example, if one RB, two RBs, four RBs, and eight RBs are supported, two bits are used to indicate a specific RBG size. Other values of the RBG size may alternatively be used. This is not limited herein.

In this embodiment of this application, alternatively, the BP subset and whether an RBG is continuous may be indicated together, and the RBG size is independently indicated. Examples are as follows:

00: the first subset of a BP, and a continuous RBG; 01: the first subset of a BP, and a discontinuous RBG; and 10: the second subset of a BP, and a continuous RBG; 11: the second subset of a BP, and a discontinuous RBG.

Certainly, the bit values may alternatively have other meanings, and herein are merely examples.

In this embodiment of this application, two bits may alternatively be used to indicate whether the BP subset is the first subset of a BP or the second subset of the BP, whether the BP subset is discontinuous, and whether an RBG is continuous. Examples are as follows:

00: the first subset of a BP, and a continuous RBG;

01: the second subset of a BP, and a continuous RBG;

10: a discontinuous BP subset, a discontinuous RBG, and the first subset of a BP; and 11: a discontinuous BP subset, a discontinuous RBG, and the second subset of a BP; or 10: a discontinuous BP subset, a continuous RBG, and the first subset of a BP; and 11: a discontinuous BP subset, a continuous RBG, and the second subset of a BP; or 00: the first subset of a BP, and a continuous RBG;

01: the second subset of a BP, and a continuous RBG;

10: a discontinuous BP subset, a discontinuous RBG, and the first subset of a BP; and 11: a discontinuous BP subset, a discontinuous RBG, and the second subset of a BP.

In this embodiment of this application, three bits may alternatively be used to indicate whether the BP subset is the first subset of a BP or the second subset of the BP, whether the BP subset is discontinuous, and whether an RBG is continuous. Examples are as follows:

000: the first subset of a BP, and a continuous RBG;

001: the second subset of a BP, and a continuous RBG;

010: a discontinuous BP subset, a discontinuous RBG, and the first subset of a BP;

011: a discontinuous BP subset, a discontinuous RBG, and the second subset of a BP;

101: a discontinuous BP subset, a continuous RBG, and the first subset of a BP; and 110: a discontinuous BP subset, a continuous RBG, and the second subset of a BP.

Certainly, the bit values may alternatively have other meanings, and herein are merely examples.

Further, in this embodiment of this application, a combination manner of an RBG size and BP subset allocation may be indicated by using a bit in the protocol header of the bitmap. For the combination manners shown in FIG. 16, to correctly indicate an RBG size and BP subset allocation, three bits are needed to perform the indication. For the combination manners shown in FIG. 17, to correctly indicate an RBG size and BP subset allocation, four bits are needed to perform the indication.

In the foregoing embodiment, discontinuous bandwidth part subsets are designed, to support resource allocation for discontinuous bandwidth part subsets, thereby avoiding resource fragmentation. In addition, a frequency diversity gain can be obtained, and transmission performance is improved.

In the foregoing embodiment of this application, there are a relatively large quantity of types of RBG sizes, and if the network device and the terminal determine an RBG size for each type of RBG size, relatively high signaling overheads are caused. In an embodiment of this application, to reduce signaling overheads, a network device may determine an RBG size set, where the RBG size set includes at least one RBG size; and determine an RBG size that needs to be used for scheduling in the set, to reduce signaling overheads. For example, if a total of eight RBG sizes are available, three bits need to be used to indicate an RBG size. If an RBG size set may be first determined, the set includes some of the RBG sizes. For example, if it is determined that the set includes two RBG sizes, only one bit is needed to indicate which RBG size in the set is specifically used; or if it is determined that the set includes four RBG sizes, only two bits are needed to indicate which RBG size in the set is specifically used. Therefore, signaling overheads can be reduced in the manner of determining an RBG size set.

Figure 20:
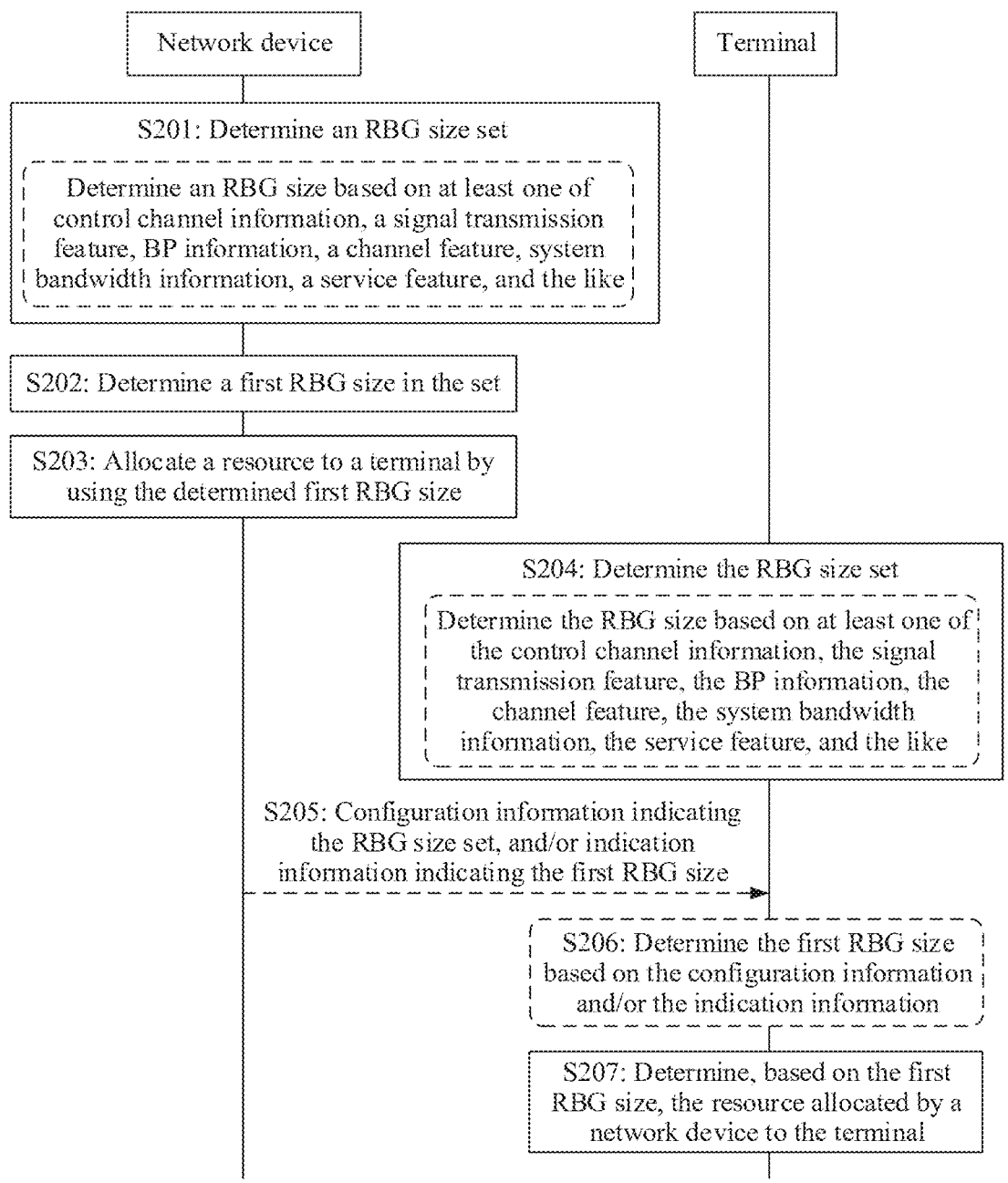
FIG. 20 is an implementation flowchart of another method for determining an RBG size according to an embodiment of this application.

FIG. 20 is an implementation flowchart of another method for determining an RBG size according to an embodiment of this application. As shown in FIG. 20, the method includes the following steps.

S201: A network device determines an RBG size set.

In this embodiment of this application, the determining an RBG size set includes: determining a quantity of RBG sizes included in the set, and specific values of the RBG sizes. For example, it is determined that the RBG size set includes two values, and the two values are eight RBs and four RBs respectively. One set may include one or more RBG sizes.

The network device may determine the RBG size set based on at least one of control channel information, a signal transmission feature, BP information, a channel feature, system bandwidth information, and a service feature. For example, the network device may determine the RBG size set based on at least one of a control channel format, control channel content, and control channel scrambling information. The network device may alternatively determine the RBG size set based on information that an allocated resource is used to carry. The information includes system information, broadcast information, cell-level information, common information, user-specific information, and group information. The network device may alternatively determine the RBG size set based on information of a bandwidth part (BP) in which the allocated resource is located. The information of the BP includes at least one of the following information: bandwidth information of the bandwidth part, carrier frequency information of the bandwidth part, and frame structure information of the bandwidth part.

In this embodiment of this application, an RBG size set corresponding to each piece of control channel information, each signal transmission feature, each BP, each channel feature, each piece of system bandwidth information, each service feature, or the like may be preset. Further, the network device may directly determine a corresponding RBG size set based on at least one of control channel information for scheduling, a signal transmission feature, BP information, each channel feature, each piece of system bandwidth information, and each service feature, and the like. The system bandwidth information may be understood as bandwidth information of system bandwidth, carrier frequency information of the system bandwidth, frame structure information of the system bandwidth, or the like. Understanding of the carrier frequency information and the frame structure information is the same as that in the foregoing descriptions.

The service feature may be understood as at least one of a mobile broadband service, a low latency service, a high reliability service, a video service, a voice service, a real-time service, a short message service, a low latency and high reliability service, and the like. The channel feature may be understood as a feature of the information that the resource allocated by the network device by using the determined RBG size is used to carry. For example, the channel feature includes at least one of transmit diversity transmission, spatial multiplexing transmission, open-loop transmission, closed transmission, wide-beam transmission, narrow-beam transmission, single-stream transmission, multi-stream transmission, single-cell transmission, and coordinated multipoint transmission.

For example, the network device determines the RBG size set based on control channel format information. In this embodiment of this application, a correspondence between each control channel format and an RBG size set may be preset. For example, an RBG size set corresponding to a DCI format 1a may be preset to include one RBG size, and the RBG size is eight RBs. An RBG size set corresponding to a DCI format 1C may be preset to include two RBG sizes, and the two RBG sizes are eight RBs and four RBs respectively. An RBG size set corresponding to a DCI format 2C, a DCI format 2D, or the like may be preset to include four RBG sizes, and the four RBG sizes are eight RBs, four RBs, two RBs, and one RB respectively.

It may be understood that, in this embodiment of this application, an RBG size set corresponding to each control channel format may be set depending on an actual situation. The foregoing descriptions are merely examples and shall not be construed as a limitation. When determining an RBG size set, the network device may determine the RBG size set based on a control channel format that needs to be used for scheduling. For example, if the network device determines that the control channel format that needs to be used for scheduling is the DCI format 1 a, it may be determined that the RBG size set includes one RBG size, and the RBG size is eight RBs. For another example, if the network device determines that the control channel format that needs to be used for scheduling is the DCI format 1C, it may be determined that the RBG size set includes two RBG sizes, and the two RBG sizes are eight RBs and four RBs respectively.

In this embodiment of this application, an implementation of determining the RBG size set is similar to the foregoing implementation of determining a specific RBG size. Therefore, refer to the foregoing related descriptions. Details are not described herein again.

S202: The network device determines a first RBG size in the RBG size set.

In this embodiment of this application, the network device may determine, in the determined RBG size set and based on a resource scheduling status, an RBG size that needs to be used for scheduling. For example, if remaining to-be-allocated resources are relatively centralized or are continuous, or a relatively large quantity of to-be-allocated resources remain, an RBG size whose RBG size value is relatively large may be selected from the determined RBG size set; or if remaining to-be-allocated resources are relatively discontinuous or are distributed, or a few to-be-allocated resources remain, an RBG size whose RBG size value is relatively small may be selected from the determined RBG size set.

In this embodiment of this application, for ease of description and to distinguish between the RBG size determined from the RBG size set and an RBG size directly determined in the manner in the foregoing embodiment, the RBG size determined from the RBG size set is referred to as the first RBG size.

S203: The network device allocates a resource to a terminal by using the determined first RBG size.

In this embodiment of this application, a corresponding RBG size set may be determined according to an actual service scheduling requirement, and the RBG size set may include one or more RBG sizes, thereby improving resource scheduling flexibility to some extent.

S204: The terminal determines the RBG size set.

In this embodiment of this application, the terminal may implicitly determine the RBG size set in a manner similar to that used by the network device, determine the first RBG size in the set, and determine, based on the first RBG size, the resource allocated by the network device to the terminal. Details are not described herein again.

In this embodiment of this application, the terminal may alternatively determine the first RBG size in the set in an explicit manner. For example, based on FIG. 20, the method may further include the following steps.

S205: The network device sends indication information and/or configuration information to the terminal.

The indication information is used to indicate the first RBG size. The configuration information is used to indicate the RBG size set.

When the network device sends only the indication information to the terminal, the configuration information may not be sent, and the terminal device may determine the RBG size set by using an implicit method. A specific method is similar to the determining method used by the network device. Details are not described herein again. In this case, the indication information may indicate only an RBG size in the RBG size set, thereby reducing signaling overheads.

When the network device sends only the configuration information to the terminal, the indication information may not be sent, and the terminal device may determine an RBG size by using an implicit method. A specific method is similar to the determining method used by the network device. Details are not described herein again. In this way, signaling overheads can be reduced.

S206: The terminal receives the indication information and/or the configuration information sent by the network device.

The terminal determines the first RBG size in the set based on the indication information; and/or the terminal determines the RBG size set based on the configuration information.

In this embodiment of this application, the implementation of determining the first RBG size by the terminal by receiving the indication information and/or the configuration information sent by the network device can reduce signaling overheads to some extent. For example, the indication information or the configuration information may be sent to the terminal by using higher layer signaling (such as RRC signaling) or physical layer information (such as DCI signaling). Same signaling or different signaling may be used for the indication information and the configuration information. For example, higher layer signaling is used for the configuration information, and physical layer signaling is used for the indication information. The higher layer signaling may be system-level or cell-level signaling, or may be user-level signaling. This is not specifically limited herein.

S207: The terminal determines, based on the first RBG size, the resource allocated by the network device to the terminal.

In this embodiment of this application, in the implementation of determining the first RBG size by the terminal by receiving the configuration information and the indication information that are sent by the network device, the configuration information may be sent to the terminal by using RRC signaling, and the indication information may be sent to the terminal by using DCI. The configuration information does not need to be carried in the DCI. Therefore, signaling overheads of the DCI can be reduced to some extent.

Further, in this embodiment of this application, the network device and the terminal may further determine a BP subset in which the resource allocated by the network device is located. For a specific implementation of determining, by the network device and the terminal, the BP subset in which the resource allocated by the network device is located, refer to related descriptions in the foregoing embodiment. Details are not described herein again.

Further, in this embodiment of this application, the BP subset may include a plurality of continuous or discontinuous RBs, and/or an RBG includes a plurality of continuous or discontinuous RBs. For a specific implementation process, refer to related descriptions in the foregoing embodiment. Details are not described herein again.

In the foregoing embodiment, the network device or the terminal may determine the RBG size set based on the BP information. The BP information may include at least one of the following information: bandwidth information of a BP, carrier frequency information of the BP, and frame structure information of the BP.

The following describes the method for determining the RBG size set by using an example in which the RBG size set is determined based on the bandwidth information of the BP.

The terminal or the network device stores a correspondence between BP bandwidth and an RBG size set. The BP bandwidth may be represented by using a quantity of resource blocks (RB). For example, the correspondence may be a correspondence between a range of BP size and an RBG size set; or may be a correspondence between a range of BP size and an RBG size, and in this case, it may be understood as that an RBG size set has only one value.

For example, the terminal or the network device stores the correspondence between a range of BP size and an RBG size set. In this case, the determining the RBG size set based on the bandwidth information of the BP may be performed by the terminal or the network device, and may include the following steps: determining a first range of BP size based on the bandwidth information of the BP; and determining an RBG size set corresponding to the first range of BP size, or determining an RBG size corresponding to the first range of BP size.

The first range of BP size is a range in which a size of the BP is located, and the size of the BP is a bandwidth size of the BP, and may be represented in a quantity of RBs. The size of the BP may be determined based on the bandwidth information of the BP. Further, the range including the size of the BP is found from ranges of BP size stored in the terminal or the network device, and is the first range of BP size.

The correspondence may be presented in a form of a table, or may be presented in another manner. A presentation form of the correspondence is not limited in this embodiment of this application, provided that the correspondence between BP bandwidth and an RBG size set, such as the correspondence between a range of BP size and an RBG size set, can be presented.

The following describes an implementation of a correspondence by using a table as an example. Table 1 shows a correspondence between a BP size and an RBG size set. A rang of BP size is represented by using a range of a quantity of RBs. P represents an RBG size, and is also expressed in a quantity of RBs.

TABLE 1

| Carrier BP size | Configuration 1 | Configuration 2 |
|---|---|---|
| First range of RBs (1$^{st}$ Range of RBs) | P = [one of {2, 4, 8, 16}] | P = [one of {2, 4, 8, 16}] |
| Second range of RBs (2$^{nd}$ Range of RBs) | P = [one of {2, 4, 8, 16}] | P = [one of {2, 4, 8, 16}] |
| Third range of RBs (3$^{rd}$ Range of RBs) | P = [one of {2, 4, 8, 16}] | P = [one of {2, 4, 8, 16}] |
| Fourth range of RBs (4$^{th}$ Range of RBs) | P = [one of {2, 4, 8, 16}] | P = [one of {2, 4, 8, 16}] |

In Table 1, each rang of BP size may correspond to RBG sizes of two configurations, such as the configuration 1 and the configuration 2. Each configuration may include a value of one RBG size. Values of RBG sizes corresponding to the two configurations form an RBG size set. The network device may send information of the configuration 1 or the configuration 2 to the terminal as the indication information, and the terminal determines the first RBG size in the foregoing embodiment based on the indication information. Information of the configuration 1 is used to instruct the terminal to use an RBG size of the configuration 1, and the information of the configuration 2 is used to instruct the terminal to use an RBG size of the configuration 2.

The following describes BP size range division with reference to tables. In the following tables, BP bandwidth is expressed in a quantity of RBs. In other words, a bandwidth size of a BP may also be referred to as a size of the BP. "-" indicates a meaning of "to". For example "36-72" indicates "36 to 72".

Table 2 gives an example of BP size range division.

TABLE 2

| BP bandwidth (unit: RB) |
| --- |
| <36 |
| 36-72 |
| 73-144 |
| 145-273 |

In the foregoing table, a boundary value between different ranges may be in a range less than the boundary value, or may be in a range greater than the boundary value. For example, in Table 2, 36 is in the range of "36-72"; and in another example, 36 may be in a range of "≤36". Other boundary values are similar thereto. Same processing may also be performed on boundary values in the following tables.

36 may be referred to as a first boundary value, 72 or 73 may be referred to as a second boundary value, 144 or 145 may be referred to as a third boundary value, and 273 may be referred to as a fourth boundary value. 36 may be replaced with 35 or 37. Then the first boundary value may be any one of [35, 36, 37]. 72 may be replaced with any one of 69-71, and correspondingly, 73 may be replaced with any one of 70-72. Then the second boundary value may be any one of 69-72 or 70-73. 144 may be replaced with any one of 137-143, and correspondingly, 145 may be replaced with any one of 138-144. Then the third boundary value may be any one of 137-144 or 138-145. The fourth boundary value is maximum BP bandwidth, for example, 273 RBs or 275 RBs. For example, Table 3 gives another example of BP division.

TABLE 3

| BP bandwidth (unit: RB) |
| --- |
| <37 |
| 37-72 |
| 73-144 |
| 145-275 |

All values within the maximum BP bandwidth are considered during BP size range division, so that each value belongs to a corresponding range, and the range is unique. In other words, no overlapping area exists between different ranges. In addition, a maximum value of the last range is a value of the maximum BP bandwidth.

In the foregoing division methods, overheads of control information during resource allocation based on each BP size are considered. The foregoing division manners are designed to balance the overheads of control information during the resource allocation based on each BP size. In other words, the overheads are as close to each other as possible. Certainly, the foregoing division manners are merely examples, and other division manners shall also fall within the protection scope of this application provided that they meet the principle that overheads are as close to each other as possible. For example, the control information may be downlink control information (DCI).

For example, the maximum BP bandwidth is 273 or 275 RBs, and an RB RBG size is selected from [2, 4, 8, 16]. If the RBG size is 16 RBs, for the 273 or 275 RBs, 18 bits are needed to indicate resources allocated in a BP (for example, the resources are allocated at a granularity of an RBG).

18 bits are used as an example. Assuming that a maximum quantity of bits for each range is 18, when the RBG size is 8, a maximum of 8×18 RBs, namely, 144 RBs, can be supported; when the RBG size is 4, a maximum of 4×18=72 RBs can be supported; or when the RBG size is 2, a maximum of 2×18 RBs, namely, 36 RBs, can be supported. In this way, Table 2, Table 3, or any alternative BP division manner thereof is designed.

A maximum value in each range may be X RBs less than a maximum quantity of RBs calculated based on a corresponding RBG size, where X is the corresponding RBG size. Therefore, the first boundary value may be any one of [35, 36, 37]; the second boundary value may be any one of 69-72 or 70-73; and the third boundary value may be any one of 137-144 or 138-145.

Table 4 gives another example of BP size range division.

TABLE 4

| BP bandwidth (unit: RB) |
| --- |
| <17 |
| 17-40 |
| 41-112 |
| 113-273 |

In the foregoing table, a boundary value between different ranges may be in a range less than the boundary value, or may be in a range greater than the boundary value.

17 may be referred to as a first boundary value, 40 or 41 may be referred to as a second boundary value, 112 or 113 may be referred to as a third boundary value, and 273 may be referred to as a fourth boundary value. 17 may be replaced with 16. Then the first boundary value may be any one of [16, 17]. 40 may be replaced with any one of 37-39, and correspondingly, 41 may be replaced with any one of 38-40. Then the second boundary value may be any one of 37-40 or 38-41. 112 may be replaced with any one of 105-111, and correspondingly, 113 may be replaced with any one of 106-112. Then the third boundary value may be any one of 105-112 or 106-113. The fourth boundary value is maximum BP bandwidth, for example, 273 RBs or 275 RBs.

In the embodiment corresponding to Table 2 or Table 3, the following principle is considered during the BP size range division: Overheads of control information during resource allocation based on different BP sizes are as close to each other as possible. In this embodiment, the following principle is considered: Overheads of control information are reduced as the BP bandwidth decreases. For example, the control information may be DCI.

In a design, a quantity of bits of the control information is designed to have a plurality of different values, and each value may correspond to one BP size range. For example, the quantity of bits of the control information may be designed to have four to six values. Further, for example, these values may be selected from [8, 10, 12, 14, 16, 18].

Table 5 gives still another example of BP size range division.

TABLE 5

| BP bandwidth (unit: RB) |
| --- |
| <68 |
| 68-136 |
| 137-204 |
| 205-273 |

In the foregoing table, a boundary value between different ranges may be in a range less than the boundary value, or may be in a range greater than the boundary value.

In this embodiment, a principle of equal division of BP size ranges is considered. Likewise, 1-273 or 275 RBs are used as an example. If the RBs are divided into four ranges, each range may include 273/4=68.25 RBs or 275/4=68.75 RBs.

The calculation result is merely a reference value for a quantity. Optionally, each range may include RBs whose quantity is any one of 65-75. In addition, ranges obtained through division may include a same quantity of RBs or different quantities of RBs. In the foregoing table, 68 RBs or 69 RBs are used as an example.

68 may be referred to as a first boundary value, 136 or 137 may be referred to as a second boundary value, 204 or 205 may be referred to as a third boundary value, and 273 may be referred to as a fourth boundary value. The first boundary value may be any one of 65-75. The second boundary value may be obtained by adding N1 RBs up to the first boundary value, where N1 may be any one of 65-75. The third boundary value may be obtained by adding N2 RBs up to the second boundary value, where N2 may be any one of 65-75. The fourth boundary value is maximum BP bandwidth, for example, 273 RBs or 275 RBs. For example, Table 6 gives another example of BP size range division.

TABLE 6

| BP bandwidth (unit: RB) |
| --- |
| <69 |
| 69-138 |
| 139-206 |
| 207-275 |

In the foregoing descriptions, an example in which four BP size ranges are obtained through division is used. However, this is not intended to limit this application. Alternatively, BP size ranges may be classified into five levels. In other words, five BP size ranges are obtained through division. Likewise, a principle of equal division of BP size ranges is considered. Likewise, 1-273 or 275 RBs are used as an example. In this case, each range may include 273/5=54.6 RBs or 273/5=55 RBs.

The calculation result is merely a reference value for a quantity. Optionally, each range may include RBs whose quantity is any one of 50-60. In addition, ranges obtained through division may include a same quantity of RBs or different quantities of RBs. 54 RBs or 55 RBs are used as an example. For example, Table 7 gives an example of RB size range division.

TABLE 7

| BP bandwidth (unit: RB) |
| --- |
| <55 |
| 55-110 |
| 111-165 |
| 166-220 |
| 221-273 |

In the foregoing table, a boundary value between different ranges may be in a range less than the boundary value, or may be in a range greater than the boundary value.

55 may be referred to as a first boundary value, 110 or 111 may be referred to as a second boundary value, 165 or 166 may be referred to as a third boundary value, 220 or 221 may be referred to as a fourth boundary value, and 273 may be referred to as a fifth boundary value. The first boundary value may be any one of 50-60. The second boundary value may be obtained by adding M1 RBs up to the first boundary value, where M1 may be any one of 50-60. The third boundary value may be obtained by adding M2 RBs up to the second boundary value, where M2 may be any one of 50-60. The fourth boundary value may be obtained by adding M3 RBs up to the third boundary value, where M3 may be any one of 50-60. The fifth boundary value is maximum BP bandwidth, for example, 273 RBs or 275 RBs. For example, Table 8 gives another example of BP size range division.

TABLE 8

| BP bandwidth (unit: RB) |
| --- |
| <56 |
| 56-112 |
| 113-166 |
| 167-222 |
| 223-275 |

By analogy, six BP size ranges may be obtained through division. Likewise, 1-273 or 275 RBs are used as an example. In this case, each range may include 273/6=45.5 RBs or 275/6=45.83 RBs.

The calculation result is merely a reference value for a quantity. Optionally, each range may include RBs whose quantity is any one of 40-50. In addition, ranges obtained through division may include a same quantity of RBs or different quantities of RBs. For example, 45 RBs or 46 RBs are used as an example. For example, Table 9 gives an example of RB size range division.

TABLE 9

| BP bandwidth (unit: RB) |
| --- |
| <45 |
| 45-90 |
| 91-136 |
| 137-182 |
| 183-228 |
| 229-273 |

In the foregoing table, a boundary value between different ranges may be in a range less than the boundary value, or may be in a range greater than the boundary value.

45 may be referred to as a first boundary value, 90 or 91 may be referred to as a second boundary value, 136 or 137 may be referred to as a third boundary value, 182 or 183 may be referred to as a fourth boundary value, 228 or 229 may be referred to as a fifth boundary value, and 273 may be referred to as a sixth boundary value. The first boundary value may be any one of 40-50. The second boundary value may be obtained by adding L1 RBs up to the first boundary value, where L1 may be any one of 40-50. The third boundary value may be obtained by adding L2 RBs up to the second boundary value, where L2 may be any one of 40-50. The fourth boundary value may be obtained by adding L3 RBs up to the third boundary value, where L3 may be any one of 40-50. The fifth boundary value may be obtained by adding L4 RBs up to the fourth boundary value, where L4 may be any one of 40-50. The sixth boundary value is maximum BP bandwidth, for example, 273 RBs or 275 RBs. For example, Table 10 gives another example of BP size range division.

TABLE 10

| BP bandwidth (unit: RB) |
|---|
| <46 |
| 46-91 |
| 92-138 |
| 139-184 |
| 185-230 |
| 231-275 |

Table 11 gives still another example of BP size range division.

TABLE 11

| BP bandwidth (unit: RB) |
|---|
| <61 |
| 61-100 |
| 101-150 |
| 151-200 |
| 201-275 |

In this division manner, BP size range division for channel state information (CSI) measurement is considered. This can ensure same division of BP size ranges for data scheduling and CSI measurement, thereby improving data transmission performance.

The foregoing lists a plurality of examples of BP size range division. The foregoing descriptions are merely examples, and are not intended to limit this application. After the BP size range division is determined, the determining the RBG size set based on the bandwidth information of the BP may be implemented based on the correspondence shown in Table 1. The RBG size set may include two RBG sizes corresponding to the configuration 1 and the configuration 2 in the table. Table 1 may be modified to another form, such as a form shown in Table 12, where $X_0$, $X_1$, ..., $X_{max}$ are boundary values of BP size ranges, and $X_{max}$ is maximum BP bandwidth.

TABLE 12

| BP bandwidth (Unit: RB) | Configuration 1 | Configuration 2 |
|---|---|---|
| $X_0 - X_1$ | RBG size 1 | RBG size 2 |
| $X_1 + 1 - X_2$ | RBG size 1' | RBG size 2' |
| $X_2 + 1 - X_3$ | RBG size 1'' | RBG size 2'' |
| ... | RBG size 1''' | RBG size 2''' |
| $Xn + 1 - X_{max}$ | RBG size 1'''' | RBG size 2'''' |

Considering overheads of control information, a design may be as follows: An RBG size increases as BP bandwidth increases (in other words, a BP size increases). The BP size ranges in Table 1 or Table 12 are classified based on reference BP bandwidth (for example, maximum or minimum BP bandwidth) in the ranges. If a level of a BP size range increases as reference BP bandwidth increases, a corresponding RBG size increases as a level of a BP size range increases.

In a design, an RBG size is selected from candidate RBG sizes. The candidate RBG sizes include [2, 4, 8, 16] or [2, 3, 4, 6, 8, 16].

Using the BP size range division shown in Table 2 or Table 3 as an example, Table 13 gives an RBG size design for the configuration 1.

TABLE 13

| BP bandwidth (unit: RB) | Config 1 |
|---|---|
| <36 or <37 | 2 |
| 36-72 or 37-72 | 4 |
| 73-144 or 73-144 | 8 |
| 145-273 or 145-275 | 16 |

When sizes of BPs of different terminals are different, a same RBG size may be used at a place in which the BPs overlap. Therefore, a candidate RBG size may be the same as an RBG size of an adjacent BP size range. Based on this, it may be designed that an RBG size of the configuration 1 is the same as an RBG size of the configuration 2, where the RBG sizes correspond to adjacent BP size ranges.

An RBG size of the configuration 1 is default RBG size, and an RBG size corresponding to the configuration 2 is candidate RBG size. In other words, when a network side does not send information of the configuration 1 or the configuration 2 to the terminal, the terminal uses an RBG size of the configuration 1 by default; or when a network side sends information of the configuration 1 or the configuration 2 to the terminal, the terminal selects and uses an RBG size based on the information sent by the network side.

Optionally, RBG sizes corresponding to at least two BP size ranges are the same, as shown in Table 14.

TABLE 14

| BP bandwidth (unit: RB) | Config 1 | Config 2 |
|---|---|---|
| <36 or <37 | 2 | 4 |
| 36-72 or 37-72 | 4 | 2 |
| 73-144 or 73-144 | 8 | 16 |
| 145-273 or 145-275 | 16 | 8 |

In this case, an RBG size of the first BP size range may be the same as an RBG size of the second BP size range; an RBG size of the second BP size range may be the same as an RBG size of the first BP size range; an RBG size of the third BP size range may be the same as an RBG size of the fourth BP size range; and an RBG size of the fourth BP size range may be the same as an RBG size of the third BP size range, so as to reduce a fragmentation probability of resources in two BP ranges when BP bandwidth resources overlap.

Another example is shown in Table 15 or Table 16.

TABLE 15

| BP bandwidth (unit: RB) | Config 1 | Config 2 |
|---|---|---|
| <36 or <37 | 2 | 8 |
| 36-72 or 37-72 | 4 | 16 |
| 73-144 or 73-144 | 8 | 4 |
| 145-273 or 145-275 | 16 | 2 |

In this case, an RBG size of the first BP size range may be the same as an RBG size of the fourth BP size range; an RBG size of the second BP size range may be the same as an RBG size of the third BP size range; an RBG size of the third BP size range may be the same as an RBG size of the first BP size range; and an RBG size of the fourth BP size range may be the same as an RBG size of the second BP size range, so as to reduce a fragmentation probability of resources in two BWP ranges when BWP bandwidth resources overlap.

TABLE 16

| BP bandwidth (unit: RB) | Config 1 | Config 2 |
|---|---|---|
| <36 or <37 | 2 | 8 |
| 36-72 or 37-72 | 4 | 16 |
| 73-144 or 73-144 | 8 | 2 |
| 145-273 or 145-275 | 16 | 4 |

In this case, an RBG size of the first BP size range may be the same as an RBG size of the third BP size range; an RBG size of the second BP size range may be the same as an RBG size of the fourth BP size range; an RBG size of the third BP size range may be the same as an RBG size of the first BP size range; and an RBG size of the fourth BP size range may be the same as an RBG size of the second BP size range, so as to reduce a fragmentation probability of resources in two BWP ranges when BWP bandwidth resources overlap.

Optionally, RBG sizes, corresponding to one BP size range, of the configuration 1 and the configuration 2 may be the same. An example is shown in Table 17.

TABLE 17

| BP bandwidth (unit: RB) | Config 1 | Config 2 |
|---|---|---|
| <36 or <37 | 2 | 2 |
| 36-72 or 37-72 | 4 | 2 |
| 73-144 or 73-144 | 8 | 4 |
| 145-273 or 145-275 | 16 | 8 |

In this case, an RBG size of the first BP size range may be the same as an RBG size of the second BP size range; an RBG size of the second BP size range may be the same as an RBG size of the third BP size range; and an RBG size of the third BP size range may be the same as an RBG size of the fourth BP size range, so as to reduce a fragmentation probability of resources in two BWP ranges when BWP bandwidth resources overlap.

Optionally, RBG sizes corresponding to at least three BP size ranges are the same, as shown in Table 18.

TABLE 18

| BP bandwidth (unit: RB) | Config 1 | Config 2 |
|---|---|---|
| <36 or <37 | 2 | 4 |
| 36-72 or 37-72 | 4 | 2 |

TABLE 18-continued

| BP bandwidth (unit: RB) | Config 1 | Config 2 |
|---|---|---|
| 73-144 or 73-144 | 8 | 4 |
| 145-273 or 145-275 | 16 | 8 |

In this case, at least one BP size range may use a same RBG size as two other BP size ranges. For example, an RBG size of the first BP size range may be the same as an RBG size of the second BP size range; an RBG size of the second BP size range may be the same as an RBG size of the first BP size range, and may also be the same as an RBG size of the third BP size range; and an RBG size of the third BP size range may be the same as an RBG size of the fourth BP size range, so as to reduce a fragmentation probability of resources in at least two BWP ranges when BWP bandwidth resources overlap.

Another example is shown in Table 19.

TABLE 19

| BP bandwidth (unit: RB) | Config 1 | Config 2 |
|---|---|---|
| <36 or <37 | 2 | 4 |
| 36-72 or 37-72 | 4 | 8 |
| 73-144 or 73-144 | 8 | 16 |
| 145-273 or 145-275 | 16 | 8 |

In this case, at least one BP size range may use a same RBG size as two other BP size ranges. For example, an RBG size of the second BP size range may be the same as an RBG size of the first BP size range; an RBG size of the third BP size range may be the same as an RBG size of the second BP size range, and may also be the same as an RBG size of the fourth BP size range; and an RBG size of the fourth BP size range may be the same as an RBG size of the third BP size range, so as to reduce a fragmentation probability of resources in at least two BWP ranges when BWP bandwidth resources overlap.

Optionally, RBG sizes corresponding to at least four bandwidth ranges are the same, as shown in Table 20.

TABLE 20

| BP bandwidth (unit: RB) | Config 1 | Config 2 |
|---|---|---|
| <36 or <37 | 2 | 4, 8, or 16 |
| 36-72 or 37-72 | 4 | 2 |
| 73-144 or 73-144 | 8 | 2 |
| 145-273 or 145-275 | 16 | 2 |

In this case, an RBG size of the first BP size range may be the same as an RBG size of the second, the third, or the fourth BP size range; an RBG size of the second BP size range may be the same as an RBG size of the first BP size range; an RBG size of the third BP size range may be the same as the RBG size of the first BP size range; and an RBG size of the fourth BP size range may be the same as the RBG size of the first BP size range, so as to reduce a fragmentation probability of resources in at least two BWP ranges when BWP bandwidth resources overlap.

Similarly, it may be designed that the second, the third, or the fourth BP size range may use a same RBG size as another BP size range, as shown in Table 21, Table 22, or Table 23.

TABLE 21

| BP bandwidth (unit: RB) | Config 1 | Config 2 |
|---|---|---|
| <36 or <37 | 2 | 4 |
| 36-72 or 37-72 | 4 | 2, 8, or 16 |
| 73-144 or 73-144 | 8 | 4 |
| 145-273 or 145-275 | 16 | 4 |

In this case, an RBG size of the second BP size range may be the same as an RBG size of the first, the third, or the fourth BP size range; an RBG size of the first BP size range may be the same as an RBG size of the second BP size range; an RBG size of the third BP size range may be the same as the RBG size of the second BP size range; and an RBG size of the fourth BP size range may be the same as the RBG size of the second BP size range, so as to reduce a fragmentation probability of resources in at least two BWP ranges when BWP bandwidth resources overlap.

TABLE 22

| BP bandwidth (unit: RB) | Config 1 | Config 2 |
|---|---|---|
| <36 or <37 | 2 | 8 |
| 36-72 or 37-72 | 4 | 8 |
| 73-144 or 73-144 | 8 | 16, 2, or 4 |
| 145-273 or 145-275 | 16 | 8 |

In this case, an RBG size of the third BP size range may be the same as an RBG size of the first, the second, or the fourth BP size range; an RBG size of the first BP size range may be the same as an RBG size of the third BP size range; an RBG size of the second BP size range may be the same as the RBG size of the third BP size range; and an RBG size of the fourth BP size range may be the same as the RBG size of the third BP size range, so as to reduce a fragmentation probability of resources in at least two BWP ranges when BWP bandwidth resources overlap.

TABLE 23

| BP bandwidth (unit: RB) | Config 1 | Config 2 |
|---|---|---|
| <36 or <37 | 2 | 16 |
| 36-72 or 37-72 | 4 | 16 |
| 73-144 or 73-144 | 8 | 16 |
| 145-273 or 145-275 | 16 | 2, 4, or 8 |

In this case, an RBG size of the fourth BP size range may be the same as an RBG size of the first, the second, or the third BP size range; an RBG size of the first BP size range may be the same as an RBG size of the fourth BP size range; an RBG size of the second BP size range may be the same as the RBG size of the fourth BP size range; and an RBG size of the third BP size range may be the same as the RBG size of the fourth BP size range, so as to reduce a fragmentation probability of resources in at least two BWP ranges when BWP bandwidth resources overlap.

RBG size designs are described in the foregoing tables by using Table 2 or Table 3 as an example. Any four-line BP size range division in the foregoing embodiments may be used to replace the range division shown in Table 2 or Table 3. In other words, the RBG size designs in the foregoing embodiments are also applicable to any BP size range division in the foregoing embodiments.

The foregoing describes the RBG size designs for BP size ranges that are divided into four lines. When the BP size ranges are divided into more or fewer lines, a same design idea may be followed.

For example, an RBG size is also selected from a range of [2, 4, 8, 16]. Optionally, RBG sizes corresponding to at least two BP size ranges are the same; or RBG sizes corresponding to at least three BP size ranges are the same; or RBG sizes corresponding to at least four BP size ranges are the same. For example, BP size ranges are divided into five lines, and RBG sizes corresponding to at least two BP size ranges are the same. Table 24, Table 25, Table 26, or Table 27 below may be obtained. Values corresponding to a configuration 1 in the tables include one case, and values corresponding to a configuration 2 may include a plurality of cases. Specifically, one of the plurality of cases may be used.

TABLE 24

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <55 or <56 | 2 | 4 | 8 | 8 | 16 | 4 |
| 55-110 or 56-112 | 2 | 8 | 4 | 4 | 8 | 8 |
| 111-165 or 113-166 | 4 | 2 | 2 | 2 | 16 | 2 |
| 166-220 or 167-222 | 8 | 16 | 16 | 16 | 4 | 4 |
| 221-273 or 223-275 | 16 | 2 | 4 | 8 | 2 | 8 |

TABLE 25

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <55 or <56 | 2 | 4 | 4 | 8 | 16 | 4 |
| 55-110 or 56-112 | 4 | 8 | 8 | 2 | 8 | 2 |
| 111-165 or 113-166 | 4 | 2 | 2 | 8 | 16 | 8 |
| 166-220 or 167-222 | 8 | 16 | 16 | 16 | 4 | 4 |
| 221-273 or 223-275 | 16 | 2 | 4 | 4 | 2 | 8 |

TABLE 26

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <55 or <56 | 2 | 4 | 4 | 8 | 16 | 4 |
| 55-110 or 56-112 | 4 | 8 | 8 | 2 | 8 | 2 |
| 111-165 or 113-166 | 8 | 2 | 2 | 4 | 16 | 2 |
| 166-220 or 167-222 | 8 | 16 | 16 | 16 | 4 | 4 |
| 221-273 or 223-275 | 16 | 2 | 4 | 8 | 2 | 8 |

TABLE 27

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <55 or <56 | 2 | 4 | 4 | 8 | 16 | 4 |
| 55-110 or 56-112 | 4 | 16 | 16 | 2 | 8 | 2 |
| 111-165 or 113-166 | 8 | 2 | 2 | 16 | 16 | 4 |
| 166-220 or 167-222 | 16 | 8 | 8 | 8 | 4 | 4 |
| 221-273 or 223-275 | 16 | 2 | 4 | 4 | 2 | 8 |

For example, BP size ranges are divided into six lines, and RBG sizes corresponding to at least two BP size ranges are the same. At least one of Table 28 to Table 30 below may be obtained. Values corresponding to a configuration 1 in the tables include one case, and values corresponding to a configuration 2 may include a plurality of cases. Specifically, one of the plurality of cases may be used.

TABLE 28

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <45 or <46 | 2 | 4 | 8 | 8 | 16 | 4 |
| 45-90 or 46-91 | 2 | 8 | 4 | 16 | 4 | 8 |
| 91-136 or 92-138 | 4 | 2 | 8 | 2 | 8 | 2 |
| 137-182 or 139-184 | 8 | 2 | 4 | 16 | 4 | 4 |
| 183-228 or 185-230 | 8 | 16 | 16 | 4 | 16 | 2 |
| 229-273 or 231-275 | 16 | 4 | 2 | 2 | 2 | 8 |

TABLE 29

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <45 or <46 | 2 | 4 | 4 | 16 | 4 | 4 |
| 45-90 or 46-91 | 4 | 8 | 8 | 8 | 16 | 2 |
| 91-136 or 92-138 | 4 | 2 | 8 | 2 | 8 | 8 |
| 137-182 or 139-184 | 8 | 2 | 2 | 4 | 2 | 2 |
| 183-228 or 185-230 | 8 | 16 | 16 | 16 | 16 | 4 |
| 229-273 or 231-275 | 16 | 4 | 4 | 2 | 4 | 8 |

TABLE 30

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <45 or <46 | 2 | 4 | 4 | 16 | 4 | 4 |
| 45-90 or 46-91 | 2 | 16 | 8 | 8 | 16 | 4 |
| 91-136 or 92-138 | 4 | 2 | 8 | 2 | 16 | 2 |
| 137-182 or 139-184 | 8 | 2 | 16 | 16 | 4 | 4 |
| 183-228 or 185-230 | 16 | 8 | 4 | 4 | 8 | 4 |
| 229-273 or 231-275 | 16 | 4 | 2 | 2 | 2 | 8 |

In the foregoing embodiments, an example in which an RBG size is selected from the range of [2, 4, 8, 16] is used. However, this application is not limited thereto. In the following embodiments, an RBG size may be selected from a range of [2, 3, 4, 6, 8, 12, 16], so as to improve flexibility for selecting an RBG value. In addition, values of 3, 6, and 12 are added for selection, so that an RBG size is the same as a size of a control channel element (CCE) of a control channel, and resource fragmentation is mitigated.

Table 31, Table 32, and Table 33 each show a table of a correspondence between a BP size range and an RBG size.

TABLE 31

| BP bandwidth (unit: RB) | Config 1 | Config 2 |
|---|---|---|
| <36 or <37 | 2 | 2 |
| 36-72 or 37-72 | 4 | 3 |
| 73-144 or 73-144 | 8 | 6 |
| 145-273 or 145-275 | 16 | 12 |

TABLE 32

| BP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <36 or <37 | 2 | 3 | 8 | 3 | 16 | 6 |
| 36-72 or 37-72 | 3 | 2 | 16 | 4 | 8 | 2 |
| 73-144 or 73-144 | 8 | 16 | 4 | 16 | 4 | 16 |
| 145-273 or 145-275 | 16 | 8 | 3 | 8 | 3 | 8 |

TABLE 33

| BWP bandwidth (unit: RB) | Config 1 | Config 2 (case 1) | Config 2 (case 2) | Config 2 (case 3) | Config 2 (case 4) | Config 2 (case 5) |
|---|---|---|---|---|---|---|
| <36 or <37 | 2 | 6 | 8 | 6 | 16 | 3 |
| 36-72 or 37-72 | 6 | 4 | 16 | 4 | 8 | 4 |
| 73-144 or 73-144 | 8 | 16 | 4 | 16 | 4 | 6 |
| 145-273 or 145-275 | 16 | 8 | 6 | 8 | 6 | 8 |

Optionally, if a relatively large value is selected from candidate values for the configuration 1, a corresponding value of the configuration 2 may be less than the corresponding value of the configuration 1 as much as possible.

Optionally, values, for one BP size range, of the configuration 1 and the configuration 2 may be the same, but values of the configuration 1 and the configuration 2 for at least one BP size range are different.

Optionally, a value, corresponding to a BP size range, of the configuration 2 is equal to a value, corresponding to an adjacent range, of the configuration 1 as much as possible.

BP size ranges are divided into four lines in the foregoing examples. The following gives examples in which BP size ranges are divided into five lines or six lines, and RBG size designs in the examples may also follow the foregoing principle, as shown in Table 34, Table 35, or Table 36.

TABLE 34

| BP bandwidth (unit: RB) | Config 1 | Config 2 (case 1) | Config 2 (case 2) | Config 2 (case 3) | Config 2 (case 4) | Config 2 (case 5) | Config 2 (case 6) |
|---|---|---|---|---|---|---|---|
| <55 or <56 | 2 | 3 | 3 | 8 | 16 | 4 | 4 |
| 55-110 or 56-112 | 3 | 2 | 4 | 2 | 8 | 6 | 2 |
| 111-165 or 113-166 | 4 | 8 | 8 | 3 | 3 | 8 | 2 |
| 166-220 or 167-222 | 8 | 16 | 16 | 16 | 2 | 4 | 4 |
| 221-273 or 223-275 | 16 | 4 | 2 | 4 | 4 | 8 | 8 |

TABLE 35

| BP bandwidth (unit: RB) | Config 1 | Config 2 (case 1) | Config 2 (case 2) | Config 2 (case 3) | Config 2 (case 4) | Config 2 (case 5) | Config 2 (case 6) |
|---|---|---|---|---|---|---|---|
| <55 or <56 | 2 | 6 | 4 | 8 | 16 | 4 | 4 |
| 55-110 or 56-112 | 4 | 2 | 6 | 6 | 6 | 6 | 2 |
| 111-165 or 113-166 | 6 | 8 | 8 | 2 | 8 | 8 | 4 |

TABLE 35-continued

| BP bandwidth (unit: RB) | Config 1 | Config 2 (case 1) | Config 2 (case 2) | Config 2 (case 3) | Config 2 (case 4) | Config 2 (case 5) | Config 2 (case 6) |
| --- | --- | --- | --- | --- | --- | --- | --- |
| 166-220 or 167-222 | 8 | 16 | 16 | 16 | 2 | 2 | 6 |
| 221-273 or 223-275 | 16 | 4 | 2 | 4 | 4 | 4 | 8 |

TABLE 36

| BP bandwidth (unit: RB) | Config 1 | Config 2 (case 1) | Config 2 (case 2) | Config 2 (case 3) | Config 2 (case 4) | Config 2 (case 5) |
| --- | --- | --- | --- | --- | --- | --- |
| <45 or <46 | 2 | 6 | 4 | 3 | 6 | 3 |
| 45-90 or 46-91 | 3 | 4 | 6 | 2 | 3 | 4 |
| 91-136 or 92-138 | 4 | 3 | 8 | 6 | 2 | 2 |
| 137-182 or 139-184 | 6 | 8 | 16 | 4 | 8 | 4 |
| 183-228 or 185-230 | 8 | 16 | 3 | 16 | 16 | 6 |
| 229-273 or 231-275 | 16 | 2 | 2 | 8 | 4 | 8 |

The foregoing designs of the correspondence between BP bandwidth and an RBG size set are merely examples, and are not intended to limit this application. Mutual reference may be made between RBG size designs in different BP bandwidth division manners.

The foregoing mainly describes the solutions provided in the embodiments of the present application from a perspective of interaction between the terminal and the network device. It may be understood that, to implement the foregoing functions, the terminal and the network device include corresponding hardware structures and/or software modules for executing the functions. With reference to the example units and algorithm steps described in the embodiments disclosed in the present application, the embodiments of the present application may be implemented by hardware, or a combination of hardware and computer software. Whether a particular function is performed by hardware or hardware driven by computer software depends on particular applications and design constraints of the technical solutions. Persons skilled in the art may use different methods to implement the described functions for each particular application, but it should not be considered that the implementation goes beyond the scope of the technical solutions in the embodiments of the present application.

In the embodiments of the present application, functional units of the terminal and the network device may be divided according to the foregoing method examples. For example, the functional units may be divided based on the functions, or two or more functions may be integrated into one processing unit. The integrated unit may be implemented in a form of hardware, or may be implemented in a form of a software functional unit.

Figure 21:
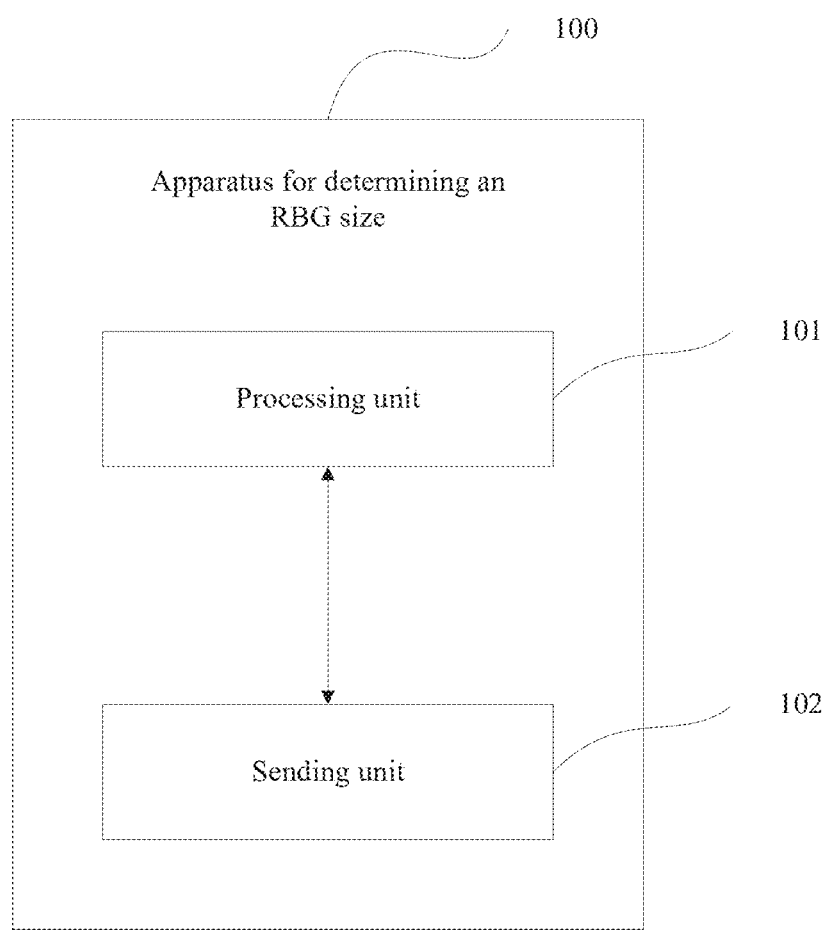
FIG. 21 is a schematic structural diagram of an apparatus for determining an RBG size according to an embodiment of this application.

FIG. 21 is a schematic structural diagram of an apparatus 100 for determining an RBG size according to an embodiment of this application when the integrated unit is used. The apparatus 100 for determining an RBG size may be applied to a network device. As shown in FIG. 21, the apparatus 100 for determining an RBG size includes a processing unit 101 and a sending unit 102.

In a possible design, the processing unit 101 is configured to: determine a resource block group (RBG) size set, where the RBG size set includes at least one RBG size; determine a first RBG size in the set; and allocate a resource to a terminal by using the first RBG size.

In a possible implementation, the processing unit 101 may determine the RBG size set based on at least one of control channel information, a signal transmission feature, BP information, a channel feature, system bandwidth information, a service feature, and the like. For example, the RBG size set may be determined in one or a combination of the following manners: determining the RBG size set based on at least one of a control channel format, control channel content, and control channel scrambling information; or determining the RBG size set based on information carried by the allocated resource, where the information includes at least one of system information, broadcast information, cell-level information, common information, user-specific information, and group information; or determining the RBG size set based on information of a bandwidth part (BP) in which the allocated resource is located, where the information of the BP includes at least one of bandwidth information of the bandwidth part, carrier frequency information of the bandwidth part, and frame structure information of the bandwidth part; or determining the RBG size set based on a channel feature; or determining the RBG size set based on a service feature.

The processing unit 101 may preset an RBG size set corresponding to each piece of control channel information, each signal transmission feature, each BP, each channel feature, each piece of system bandwidth information, each service feature, or the like.

The processing unit 101 may determine the RBG size set in a manner of predefinition by a protocol, or determine the RBG size set in a manner of signaling notification.

In another possible design, the processing unit 101 may be configured to determine an RBG size. The processing unit may determine the RBG size based on at least one of control channel information, a signal transmission feature, BP information, a channel feature, system bandwidth information, a service feature, and the like. For example, the RBG size is determined in one or a combination of the following manners: determining the RBG size based on at least one of a control channel format, control channel content, and control channel scrambling information; or determining the RBG size based on information carried by the allocated resource, where the information includes at least one of system information, broadcast information, cell-level information, common information, user-specific information, and group information; or determining the RBG size based on information of a bandwidth part (BP) in which the allocated resource is located, where the information of the BP includes at least one of bandwidth information of the bandwidth part, carrier frequency information of the bandwidth part, and frame structure information of the bandwidth part; or determining the RBG size set based on a channel feature; or determining the RBG size based on a service feature.

The processing unit 101 may determine the RBG size based on at least one of control channel information, a signal transmission feature, BP information, a channel feature, system bandwidth information, a service feature, and the like.

The processing unit 101 may determine the RBG size in a manner of predefinition by a protocol, or determine the RBG size in a manner of signaling notification.

In a possible design, the sending unit 102 is configured to send indication information to the terminal. The indication information is used to indicate the first RBG size.

Further, the sending unit 102 is further configured to send configuration information to the terminal. The configuration information is used to indicate the RBG size set.

In a possible implementation, the processing unit 101 is further configured to determine a BP subset in which the allocated resource is located.

The processing unit 101 may determine, based on subset information, the BP subset in which the allocated resource is located. Specifically, the subset information may include at least one of a subset size, a subset resource division method, a subset quantity, and subset scheduling information.

The processing unit 101 may determine, based on the first RBG size, a size of the BP subset in which the allocated resource is located.

Further, the processing unit 101 is further configured to determine whether the BP subset is continuous. The BP subset includes a plurality of continuous or discontinuous resource blocks (RBs). Whether the BP subset is continuous may be predefined by a protocol, or may be determined in a manner of signaling notification.

In another possible design, the processing unit 101 is further configured to determine whether an RBG is continuous. RBs included in an RBG may be continuous or discontinuous. A spacing between RBs in a discontinuous RBG may be predefined by a protocol, or may be determined in a manner of signaling notification.

It may be understood that, in this embodiment of this application, for concepts, explanations, detailed descriptions, and other steps that are related to the apparatus 100 for determining an RBG size and that are related to the technical solutions provided in the embodiments of this application, reference may be made to descriptions about such content in the foregoing method embodiments or other embodiments. Details are not described herein again.

Figure 22:
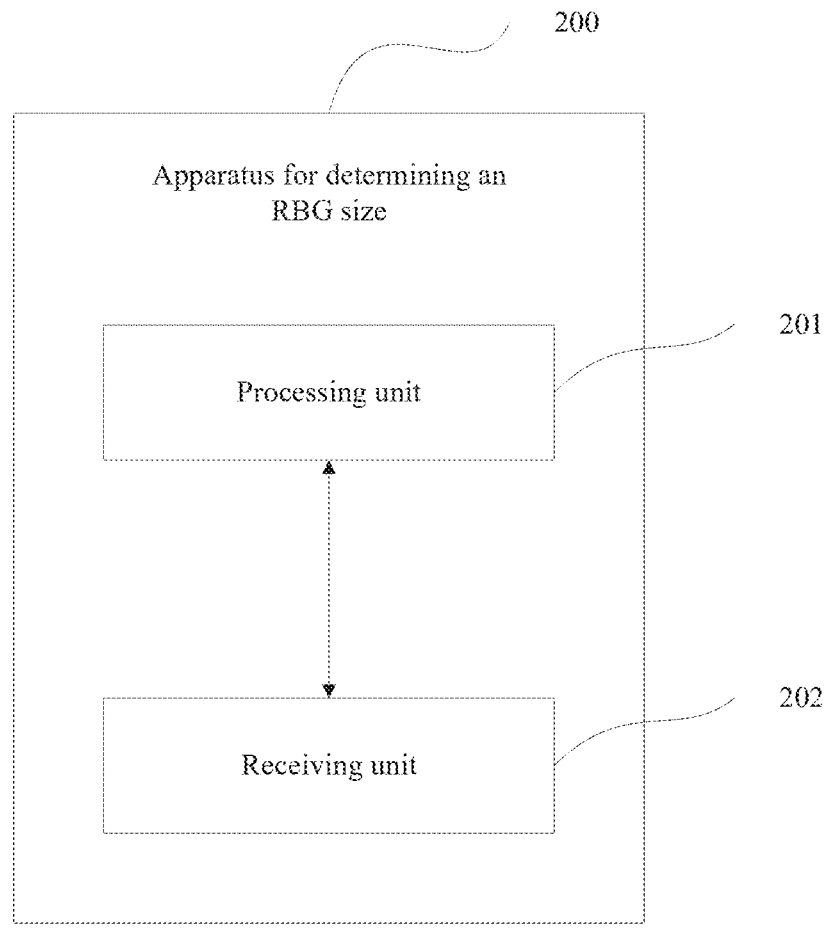
FIG. 22 is a schematic structural diagram of another apparatus for determining an RBG size according to an embodiment of this application.

FIG. 22 is a schematic structural diagram of an apparatus 200 for determining an RBG size according to an embodiment of this application when the integrated unit is used. The apparatus 200 for determining an RBG size may be applied to a terminal. As shown in FIG. 22, the apparatus 200 for determining an RBG size includes a processing unit 201 and a receiving unit 202.

In a possible design, the processing unit 201 is configured to: determine a resource block group (RBG) size set, where the RBG size set includes at least one RBG size; determine a first RBG size in the set; and determine, based on the first RBG size, a resource allocated by a network device to the terminal.

The processing unit 201 may determine the RBG size set based on at least one of control channel information, a signal transmission feature, BP information, a channel feature, system bandwidth information, a service feature, and the like. For example, the RBG size set may be determined in one or a combination of the following manners: determining the RBG size set based on at least one of a control channel format, control channel content, and control channel scrambling information; or determining the RBG size set based on information carried by the resource allocated by the network device, where the information include at least one of system information, broadcast information, cell-level information, common information, user-specific information, and group information; or determining the RBG size set based on information of a bandwidth part (BP) in which the resource allocated by the network device is located, where the information of the BP includes at least one of bandwidth information of the bandwidth part, carrier frequency information of the bandwidth part, and frame structure information of the bandwidth part.

The processing unit 201 may preset an RBG size set corresponding to each piece of control channel information, each signal transmission feature, each BP, each channel feature, each piece of system bandwidth information, each service feature, or the like.

The processing unit 201 may determine the RBG size set in a manner of predefinition by a protocol, or determine the RBG size set in a manner of signaling notification.

In another possible design, the processing unit 201 may be configured to determine an RBG size. The processing unit may determine the RBG size based on at least one of control channel information, a signal transmission feature, BP information, a channel feature, system bandwidth information, a service feature, and the like. For example, the RBG size is determined in one or a combination of the following manners: determining the RBG size based on at least one of a control channel format, control channel content, and control channel scrambling information; or determining the RBG size based on information carried by the allocated resource, where the information includes at least one of system information, broadcast information, cell-level information, common information, user-specific information, and group information; or determining the RBG size based on information of a bandwidth part (BP) in which the allocated resource is located, where the information of the BP includes at least one of bandwidth information of the bandwidth part, carrier frequency information of the bandwidth part, and frame structure information of the bandwidth part; or determining the RBG size set based on a channel feature; or determining the RBG size based on a service feature.

The processing unit 201 may determine the RBG size based on at least one of control channel information, a signal transmission feature, BP information, a channel feature, system bandwidth information, a service feature, and the like.

The processing unit 201 may determine the RBG size in a manner of predefinition by a protocol, or determine the RBG size in a manner of signaling notification.

In a possible design, the receiving unit 202 is configured to receive indication information sent by the network device. The indication information is used to indicate the first RBG size. The processing unit 201 may determine the first RBG size in the set based on the indication information received by the receiving unit 202.

Further, the receiving unit 202 is further configured to receive configuration information sent by the network device. The configuration information is used to indicate the RBG size set. The processing unit 201 may determine the RBG size set based on the configuration information received by the receiving unit 202.

In another possible design, the processing unit 202 may further determine a BP subset in which the resource allocated by the network device is located. The BP subset includes a plurality of continuous or discontinuous resource blocks (RBs).

The processing unit 201 may determine, based on subset information, the BP subset in which the allocated resource is located. Specifically, the subset information may include at least one of a subset size, a subset resource division method, a subset quantity, and subset scheduling information.

The processing unit 201 may determine, based on the first RBG size, a size of the BP subset in which the resource allocated by the network device is located.

Further, the processing unit 201 is further configured to determine whether the BP subset is continuous. The BP subset includes a plurality of continuous or discontinuous resource blocks (RBs). Whether the BP subset is continuous may be predefined by a protocol, or may be determined in a manner of signaling notification.

In another possible design, the processing unit 201 is further configured to determine whether an RBG is continuous. RBs included in an RBG may be continuous or discontinuous. A spacing between RBs in a discontinuous RBG may be predefined by a protocol, or may be determined in a manner of signaling notification.

It may be understood that, in this embodiment of this application, for concepts, explanations, detailed descriptions, and other steps that are related to the apparatus 200 for determining an RBG size and that are related to the technical solutions provided in the embodiments of this application, reference may be made to descriptions about such content in the foregoing method embodiments or other embodiments. Details are not described herein again.

It should be understood that the unit division of the apparatus 100 for determining an RBG size and the apparatus 200 for determining an RBG size is merely logical function division. In actual implementation, all or some of the units may be integrated into one physical entity, or may be physically separated. In addition, all of the units may be implemented by a processing element invoking software; or all of the units may be implemented by hardware; or some of the units may be implemented by a processing element invoking software, and some of the units may be implemented by hardware. For example, the processing unit may be an independent processing element, or may be integrated in a chip of the network device or the terminal. Alternatively, the processing unit may be stored, in a form of a program, in a memory of the network device or the terminal, and a processing element of the network device or the terminal invokes the program to execute a function of the unit. Implementations of other units are similar. In addition, some or all of the units may be integrated, or may be independently implemented. The processing element herein may be an integrated circuit having a signal processing capability. In an implementation process, the steps of the foregoing methods or the foregoing units may be implemented by using an integrated logic circuit of hardware of the processing element or by using an instruction in a software form. In addition, the receiving unit is a unit that controls receiving, and may receive information sent by the network device through a receiving apparatus of the terminal, such as an antenna and a radio frequency apparatus. The sending unit is a unit that controls sending, and may send information to the terminal through a sending apparatus of the network device, such as an antenna and a radio frequency apparatus.

For example, the foregoing units may be configured as one or more integrated circuits to implement the foregoing methods, for example, one or more application-specific integrated circuits (ASIC), one or more microprocessors (digital signal processor, DSP), or one or more field programmable gate arrays (FPGA). For another example, when one of the foregoing units is implemented by a processing element invoking a program, the processing element may be a general-purpose processor such as a central processing unit (CPU), or another processor that can invoke a program. For another example, the units may be integrated and implemented in a form of a system-on-a-chip (SOC).

Figure 23:
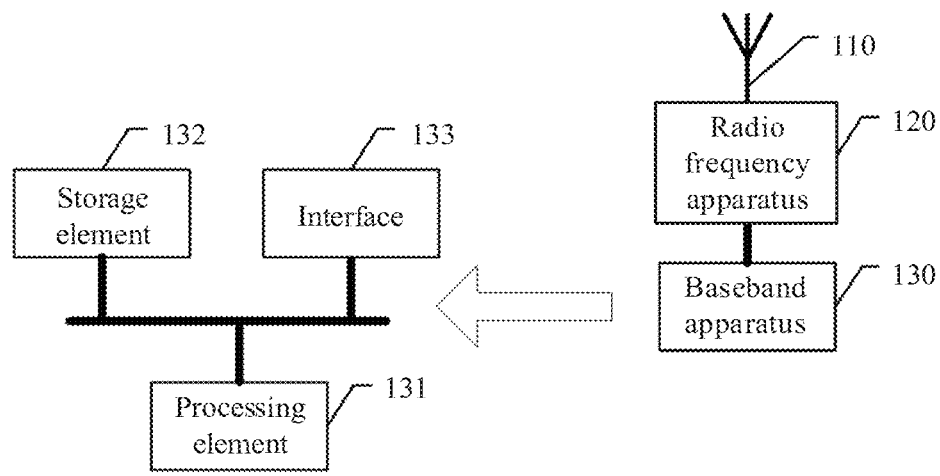
FIG. 23 is a schematic structural diagram of a network device according to an embodiment of this application.

FIG. 23 is a schematic structural diagram of a network device according to an embodiment of this application. The network device may be the network device in the foregoing embodiments, and is configured to perform the operations performed by the network device in the foregoing embodiments. As shown in FIG. 23, the network device includes an antenna no, a radio frequency apparatus 120, and a baseband apparatus 130. The antenna no is connected to the radio frequency apparatus 120. In an uplink direction, the radio frequency apparatus 120 receives, through the antenna no, information sent by a terminal; and sends, to the baseband apparatus 130 for processing, the information sent by the terminal. In a downlink direction, the baseband apparatus 130 processes information of a terminal, and sends processed information to the radio frequency apparatus 120. After processing the information of the terminal, the radio frequency apparatus 120 sends processed information to the terminal through the antenna no.

The baseband apparatus 30 may be one apparatus physically, or may be at least two apparatuses that are physically separated, for example, includes a CU and at least one DU. The DU and the radio frequency apparatus 120 may be integrated in one apparatus, or may be physically separated. Protocol layer division between the at least two apparatuses of the baseband apparatus 130 that are physically separated is not limited. For example, the baseband apparatus 130 is configured to perform processing for protocol layers such as an RRC layer, a Packet Data Convergence Protocol (PDCP) layer, a Radio Link Control (RLC) layer, a MAC (Media Access Control) layer, and a physical layer. Division may be made between any two protocol layers, so that the baseband apparatus includes two apparatuses that are physically separated, and the two apparatuses are configured to perform processing for protocol layers for which the two apparatuses are respectively responsible. For example, division is performed between RRC and PDCP. For another example, division is performed between PDCP and RLC. In addition, division may alternatively be performed within a protocol layer. For example, a part of a protocol layer and protocol layers above the protocol layer are integrated in one apparatus, and a remaining part of the protocol layer and protocol layers below the protocol layer are integrated in another apparatus. The apparatus 100 for determining an RBG size may be located in one of the at least two apparatuses of the baseband apparatus 130 that are physically separated.

The network device may include a plurality of baseband boards. A plurality of processing elements may be integrated in the baseband board, to implement required functions. The baseband apparatus 130 may include at least one baseband board, and the apparatus 100 for determining an RBG size may be located in the baseband apparatus 130. In an implementation, the units shown in FIG. 21 are implemented by a processing element invoking a program. For example, the baseband apparatus 130 includes a processing element 131 and a storage element 132. The processing element 131 invokes a program stored in the storage element 132, to perform the method performed by the network device in the foregoing method embodiments. In addition, the baseband apparatus 130 may further include an interface 133, configured to exchange information with the radio frequency apparatus 120. For example, the interface is a common public radio interface (CPRI). When the baseband apparatus 130 and the radio frequency apparatus 120 are physically disposed together, the interface may be an intra-board interface or inter-board interface. The board herein is a circuit board.

In another implementation, the units shown in FIG. 21 may be configured as one or more processing elements to implement the method performed by the foregoing network device. The processing elements are disposed on the baseband apparatus 130. The processing elements herein may be integrated circuits, for example, one or more ASICs, one or more DSPs, or one or more FPGAs. The integrated circuits may be integrated to form a chip.

For example, the units shown in FIG. 21 may be integrated and implemented in a form of a system-on-a-chip (SOC). For example, the baseband apparatus 130 includes an SOC chip, to implement the foregoing methods. A processing element 111 and a storage element 132 may be integrated in the chip, and the processing element 131 invokes a program stored in the storage element 132 to implement the method performed by the foregoing network device or the functions of the units shown in FIG. 21. Alternatively, at least one integrated circuit may be integrated in the chip, to implement the method performed by the foregoing network device or the functions of the units shown in FIG. 21. Alternatively, the foregoing implementations may be combined. Functions of some units are implemented by a processing element invoking a program, and functions of some units are implemented by using an integrated circuit.

Regardless of which manner is used, the apparatus 100, applied to the network device, for determining an RBG size includes at least one processing element and a storage element. The at least one processing element is configured to perform the method performed by the network device in the foregoing method embodiments. The processing element may perform some or all of the steps performed by the network device in the foregoing method embodiments in a first manner: executing a program stored in the storage element. Alternatively, the processing element may perform some or all of the steps performed by the network device in the foregoing method embodiments in a second manner: using an integrated logic circuit of hardware of the processing element in combination with an instruction. Certainly, the processing element may perform some or all of the steps performed by the network device in the foregoing method embodiments by combining the first manner and the second manner.

Similar to the foregoing descriptions, the processing element herein may be a general-purpose processor such as a central processing unit (CPU), or may be configured as one or more integrated circuits to implement the foregoing methods, for example, one or more application-specific integrated circuits (ASIC), one or more microprocessors (digital signal processor, DSP), or one or more field programmable gate arrays (FPGA).

The storage element may be a memory, or may be a collective term for a plurality of storage elements.

Figure 24:
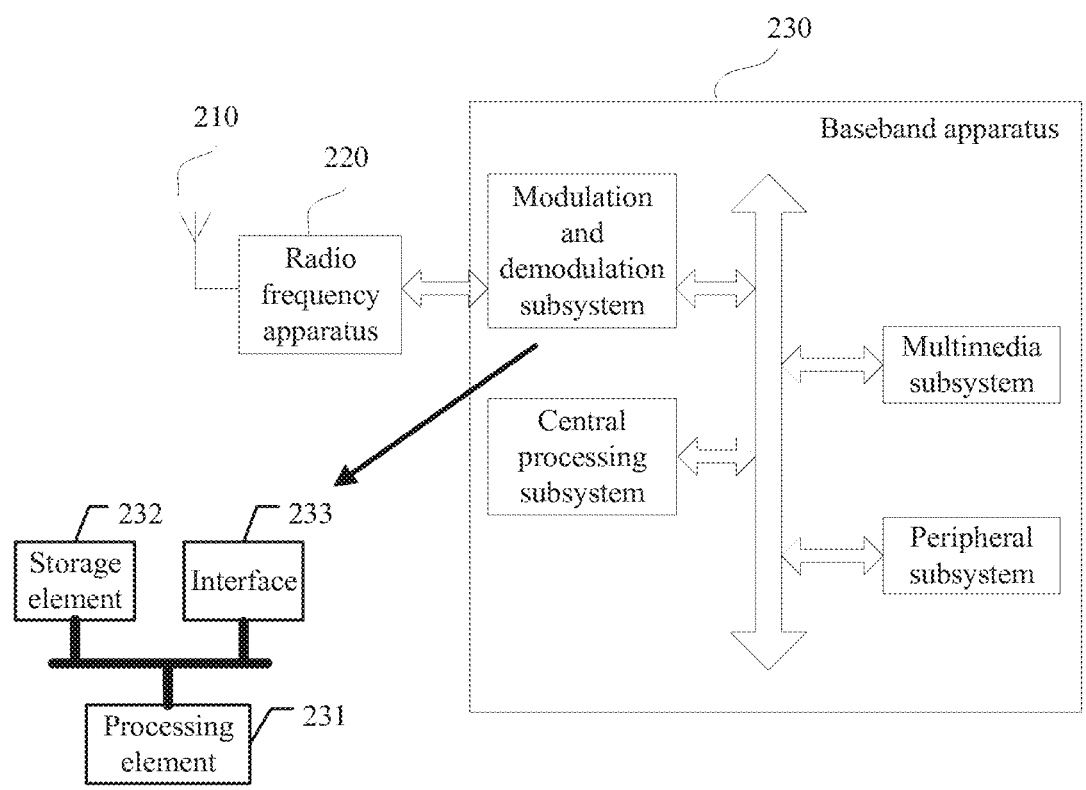
FIG. 24 is a schematic structural diagram of a terminal according to an embodiment of this application.

FIG. 24 is a schematic structural diagram of a terminal according to an embodiment of this application. The terminal may be the terminal in the foregoing embodiments, and is configured to perform the operations performed by the terminal in the foregoing embodiments. As shown in FIG. 24, the terminal includes an antenna 210, a radio frequency apparatus 220, and a baseband apparatus 230. The antenna 210 is connected to the radio frequency apparatus 220. In a downlink direction, the radio frequency apparatus 220 receives, through the antenna 210, information sent by a network device; and sends, to the baseband apparatus 230 for processing, the information sent by the network device. In an uplink direction, the baseband apparatus 230 processes information of the terminal, and sends processed information to the radio frequency apparatus 220. After processing the information of the terminal, the radio frequency apparatus 220 sends processed information to the network device through the antenna 210.

The baseband apparatus may include a modem subsystem, configured to implement data processing of various communications protocol layers; and may further include a central processing subsystem, configured to implement processing for a terminal operating system and an application layer. In addition, the baseband apparatus may further include other subsystems, such as a multimedia subsystem and a peripheral subsystem. The multimedia subsystem is configured to implement control on a terminal camera, screen display, or the like. The peripheral subsystem is configured to implement a connection to another device. The modem subsystem may be an independent chip. Optionally, the apparatus 200 for determining an RBG size may be implemented in the modem subsystem.

In an implementation, the units shown in FIG. 22 are implemented by a processing element invoking a program. For example, a subsystem of the baseband apparatus 230, for example, the modem subsystem, includes a processing element 231 and a storage element 232. The processing element 231 invokes a program stored in the storage element 232, to perform the method performed by the terminal in the foregoing method embodiments. In addition, the baseband apparatus 230 may further include an interface 233, configured to exchange information with the radio frequency apparatus 220.

In another implementation, the units shown in FIG. 22 may be configured as one or more processing elements to implement the method performed by the foregoing terminal. The processing elements are disposed in a subsystem of the baseband apparatus 230, for example, the modem subsystem. The processing elements herein may be integrated circuits, for example, one or more ASICs, one or more DSPs, or one or more FPGAs. The integrated circuits may be integrated to form a chip.

For example, the units shown in FIG. 22 may be integrated and implemented in a form of a system-on-a-chip (SOC). For example, the baseband apparatus 230 includes an SOC chip, to implement the foregoing methods. A processing element 231 and a storage element 232 may be integrated in the chip, and the processing element 231 invokes a program stored in the storage element 232 to implement the method performed by the foregoing terminal or the functions of the units shown in FIG. 22. Alternatively, at least one integrated circuit may be integrated in the chip, to implement the method performed by the foregoing terminal or the functions of the units shown in FIG. 22. Alternatively, the foregoing implementations may be combined. Functions of some units are implemented by a processing element invoking a program, and functions of some units are implemented by using an integrated circuit.

Regardless of which manner is used, the apparatus 200, applied to the terminal, for determining an RBG size includes at least one processing element and a storage element. The at least one processing element is configured to perform the method performed by the terminal in the foregoing method embodiments. The processing element may perform some or all of the steps performed by the terminal in the foregoing method embodiments in a first manner: executing a program stored in the storage element. Alternatively, the processing element may perform some or all of the steps performed by the terminal in the foregoing method embodiments in a second manner: using an integrated logic circuit of hardware of the processor element in combination with an instruction. Certainly, the processing element may perform some or all of the steps performed by the terminal in the foregoing method embodiments by combining the first manner and the second manner.

Similar to the foregoing descriptions, the processing element herein may be a general-purpose processor such as a central processing unit (CPU), or may be configured as one or more integrated circuits to implement the foregoing methods, for example, one or more application-specific integrated circuits (ASIC), one or more microprocessors (digital signal processor, DSP), or one or more field programmable gate arrays (FPGA).

The storage element may be a memory, or may be a collective term for a plurality of storage elements.

According to the methods provided in the embodiments of this application, an embodiment of the present application further provides a communications system. The communications system includes the foregoing network device and one or more terminals.

An embodiment of this application further provides an apparatus for determining an RBG size. The apparatus for determining an RBG size is applied to a network device or a terminal, and includes at least one processing element (or chip) configured to perform the foregoing method embodiments.

This application provides a program for determining an RBG size. When being executed by a processor, the program is used to perform the methods in the foregoing embodiments.

This application further provides a program product, for example, a computer-readable storage medium, including the foregoing program for determining an RBG size.

Persons skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a CD-ROM, an optical memory, or the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to the embodiments of this application without departing from the spirit and scope of this application. This application is intended to cover these modifications and variations of the embodiments of this application provided that they fall within the scope of protection defined by the following claims and their equivalent technologies.

The invention claimed is:

1. A method for wireless communication, comprising:
determining a resource block group (RBG) size for a bandwidth part (BP) of a terminal device based on a configuration; and
determining, based on the determined RBG size, a resource allocated by a network device to the terminal device;
wherein the configuration is either a first configuration or a second configuration, and a size of the BP belongs to a BP size range of multiple BP size ranges, each BP size range of the multiple BP size ranges is respectively associated with both the first configuration and the second configuration;
wherein the multiple BP size ranges comprise the following size ranges:
a first BP size range of 1 resource block (RB) to 36 RBs;
a second BP size range of 37 RBs to 72 RBs; and
a third BP size range of 73 RBs to 144 RBs; and
wherein:
the first BP size range and the first configuration defines an RBG size of 2 RBs;
the first BP size range and the second configuration defines an RBG size of 4 RBs;
the second BP size range and the first configuration defines an RBG size of 4 RBs;
the second BP size range and the second configuration defines an RBG size of 8 RBs;
the third BP size range and the first configuration defines an RBG size of 8 RBs; and
the third BP size range and the second configuration defines an RBG size of 16 RBs.

2. The method according to claim 1, wherein the multiple BP size ranges further comprise the following size range: a fourth BP size range of 145 RBs to a maximum BP bandwidth.

3. The method according to claim 2, wherein the maximum BP bandwidth is 275 RBs or 273 RBs.

4. The method according to claim 2, wherein the fourth BP size range and the first configuration defines one of the following RBG sizes:
a size of 2 RBs, a size of 4 RBs, a size of 8 RBs, or a size of 16 RBs.

5. The method according to claim 2, wherein the fourth BP size range and the second configuration defines one of the following RBG sizes:
a size of 2 RBs, a size of 4 RBs, a size of 8 RBs, or a size of 16 RBs.

6. The method according to claim 1, further comprising:
receiving signaling from the network device, wherein the signaling indicates that the configuration is the first configuration, or the signaling indicates that the configuration is the second configuration.

7. The method according to claim 6, wherein the signaling is radio resource control (RRC) signaling.

8. The method according to claim 1, further comprising:
receiving a bitmap from the network device, wherein the bitmap indicates the resource for the terminal device based on the RBG size for the BP.

9. The method according to claim 1, wherein determining the RBG size comprises:
using a default RBG size which corresponds to the first configuration.

10. The method according to claim 9, wherein the default RBG size is used as the determined RBG size when a terminal has no indication information obtained from the network device indicating the configuration.

11. A method for wireless communication, comprising:
configuring a bandwidth part (BP) for a terminal device; and
sending signaling to the terminal device, wherein the signaling indicates a configuration;
wherein the configuration is either a first configuration or a second configuration, and a size of the BP belongs to a BP size range of multiple BP size ranges, each BP size range of the multiple BP size ranges is respectively associated with both the first configuration and the second configuration;
wherein the multiple BP size ranges comprise the following size ranges:
a first BP size range of 1 resource block (RB) to 36 RBs;
a second BP size range of 37 RBs to 72 RBs; and
a third BP size range of 73 RBs to 144 RBs; and
wherein:
the first BP size range and the first configuration defines a RBG size of 2 RBs;
the first BP size range and the second configuration defines a RBG size of 4 RBs;
the second BP size range and the first configuration defines a RBG size of 4 RBs;
the second BP size range and the second configuration defines a RBG size of 8 RBs;
the third BP size range and the first configuration defines a RBG size of 8 RBs; and
the third BP size range and the second configuration defines a RBG size of 16 RBs.

12. The method according to claim 11, wherein the multiple BP size ranges further comprise the following size range: a fourth BP size range of 145 RBs to a maximum BP bandwidth.

13. The method according to claim 12, wherein the maximum BP bandwidth is 275 RBs or 273 RBs.

14. The method according to claim 12, wherein the fourth BP size range and the first configuration defines one of the following RBG sizes:
a size of 2 RBs, a size of 4 RBs, a size of 8 RBs, or a size of 16 RBs.

15. The method according to claim 12, wherein the fourth BP size range and the second configuration defines one of the following RBG sizes:
a size of 2 RBs, a size of 4 RBs, a size of 8 RBs, or a size of 16 RBs.

16. The method according to claim 11, further comprising:
determining the configuration indicated by the signaling based on the size of the BP and a relationship among the BP size range, the first configuration, and the second configuration.

17. The method according to claim 11, further comprising:
sending a bitmap to the terminal device, wherein the bitmap indicates a resource for the terminal device based on a RBG size corresponding to the configuration indicated by the signaling.

18. The method according to claim 11, wherein the signaling indicates that the configuration is the first configuration, or the signaling indicates that the configuration is the second configuration.

19. The method according to claim 11, wherein the signaling is radio resource control (RRC) signaling.

20. An apparatus, comprising:
at least one processor operably coupled to at least one memory, the at least one processor being configured to:
determine a resource block group (RBG) size for a bandwidth part (BP) of a terminal device based on a configuration; and
determine, based on the determined RBG size, a resource allocated by a network device to the terminal device,
wherein the configuration is either a first configuration or a second configuration, and a size of the BP belongs to a BP size range of multiple BP size ranges, each BP size range of the multiple BP size ranges is respectively associated with both the first configuration and the second configuration;
wherein the multiple BP size ranges comprise the following size ranges:
a first BP size range of 1 resource block (RB) to 36 RBs;
a second BP size range of 37 RBs to 72 RBs; and
a third BP size range of 73 RBs to 144 RBs; and
wherein:
the first BP size range and the first configuration defines a RBG size of 2 RBs;
the first BP size range and the second configuration defines a RBG size of 4 RBs;
the second BP size range and the first configuration defines a RBG size of 4 RBs;
the second BP size range and the second configuration defines a RBG size of 8 RBs;
the third BP size range and the first configuration defines a RBG size of 8 RBs; and the third BP size range and the second configuration defines a RBG size of 16 RBs.

21. The apparatus according to claim 20, wherein the multiple BP size ranges further comprise the following size range: a fourth BP size range of 145 RBs to a maximum BP bandwidth.

22. The apparatus according to claim 21, wherein the maximum BP bandwidth is 275 RBs or 273 RBs.

23. The apparatus according to claim 21, wherein the fourth BP size range and the first configuration defines one of the following RBG sizes:
a size of 2 RBs, a size of 4 RBs, a size of 8 RBs, or a size of 16 RBs.

24. The apparatus according to claim 21, wherein the fourth BP size range and the second configuration defines one of the following RBG sizes:
a size of 2 RBs, a size of 4 RBs, a size of 8 RBs, or a size of 16 RBs.

25. The apparatus according to claim 20, wherein the at least one processor is further configured to:
receive signaling from the network device, wherein the signaling indicates that the configuration is the first configuration, or the signaling indicates that the configuration is the second configuration.

26. An apparatus, comprising:
at least one processor operably coupled to at least one memory, the at least one processor being configured to:
configure a bandwidth part (BP) for a terminal device; and
send signaling to the terminal device, wherein the signaling indicates a configuration;
wherein the configuration is either a first configuration or a second configuration, and a size of the BP belongs to a BP size range of multiple BP size ranges, each BP size range of the multiple BP size ranges is respectively associated with both the first configuration and the second configuration;
wherein the multiple BP size ranges comprise the following size ranges:
a first BP size range of 1 resource block (RB) to 36 RBs;
a second BP size range of 37 RBs to 72 RBs; and
a third BP size range of 73 RBs to 144 RBs; and
wherein:
the first BP size range and the first configuration defines a RBG size of 2 RBs;
the first BP size range and the second configuration defines a RBG size of 4 RBs;
the second BP size range and the first configuration defines a RBG size of 4 RBs;
the second BP size range and the second configuration defines a RBG size of 8 RBs;
the third BP size range and the first configuration defines a RBG size of 8 RBs; and
the third BP size range and the second configuration defines a RBG size of 16 RBs.

27. The apparatus according to claim 26, wherein the multiple BP size ranges further comprise the following size range: a fourth BP size range of 145 RBs to a maximum BP bandwidth.

28. The apparatus according to claim 27, wherein the maximum BP bandwidth is 275 RBs or 273 RBs.

29. The apparatus according to claim 27, wherein the fourth BP size range and the first configuration defines one of the following RBG sizes:
a size of 2 RBs, a size of 4 RBs, a size of 8 RBs, or a size of 16 RBs.

30. The apparatus according to claim 27, wherein the fourth BP size range and the second configuration defines one of the following RBG sizes:
a size of 2 RBs, a size of 4 RBs, a size of 8 RBs, or a size of 16 RBs.

* * * * *

UNITED STATES PATENT AND TRADEMARK OFFICE
CERTIFICATE OF CORRECTION

| | | |
|---|---|---|
| PATENT NO. | : 11,582,013 B2 | Page 1 of 1 |
| APPLICATION NO. | : 17/658393 | |
| DATED | : February 14, 2023 | |
| INVENTOR(S) | : Wang et al. | |

It is certified that error appears in the above-identified patent and that said Letters Patent is hereby corrected as shown below:

In the Specification

In the Detailed Description of Illustrative Embodiments, Column 46, Lines 19, 20, 22, and 30; delete "antenna no" and insert --antenna 110--.

In the Detailed Description of Illustrative Embodiments, Column 46, Line 31; delete "30" and insert --130--.

Signed and Sealed this
Twenty-first Day of March, 2023

Katherine Kelly Vidal
*Director of the United States Patent and Trademark Office*